US010217438B2

(12) United States Patent
Marcu et al.

(10) Patent No.: US 10,217,438 B2
(45) Date of Patent: Feb. 26, 2019

(54) USER INTERFACE AND METHOD FOR DIRECTLY SETTING DISPLAY WHITE POINT

(71) Applicant: Apple Inc., Cupertino, CA (US)

(72) Inventors: Gabriel Marcu, San Jose, CA (US); Kenneth I. Greenebaum, San Carlos, CA (US); Ian C. Hendry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 345 days.

(21) Appl. No.: 14/291,194

(22) Filed: May 30, 2014

(65) Prior Publication Data

US 2015/0348502 A1 Dec. 3, 2015

(51) Int. Cl.
*G09G 5/04* (2006.01)
*G06K 9/46* (2006.01)
(Continued)

(52) U.S. Cl.
CPC ............. *G09G 5/04* (2013.01); *G06K 9/4652* (2013.01); *G09G 3/2003* (2013.01); *G09G 5/02* (2013.01); *G09G 5/10* (2013.01); *H04N 9/3182* (2013.01); *H04N 9/73* (2013.01); *G09G 2320/0606* (2013.01); *G09G 2320/0666* (2013.01); *G09G 2320/0693* (2013.01); *G09G 2354/00* (2013.01); *H04N 1/6077* (2013.01)

(58) Field of Classification Search
CPC .......... G09G 5/40; G09G 5/2003; G09G 5/02; G09G 5/10; G09G 5/04; G09G 5/003; G09G 3/2003; G09G 3/22; G09G 2320/0666; G09G 5/006; G09G 5/002; G09G 2320/0693; G09G 2340/06; G09G 2360/145; G06K 9/4652; G06T 7/408; G06T 7/90; H04N 9/3182; H04N 9/73; H04N 9/77; H04N 1/6077; H04N 1/60
See application file for complete search history.

(56) References Cited

U.S. PATENT DOCUMENTS 4,553,141 A * 11/1985 Flasza ................. H04N 9/73
345/22
5,311,294 A * 5/1994 Cromer ................ H04N 9/73
345/904

(Continued)

*Primary Examiner* — Devona E Faulk
*Assistant Examiner* — Charles L Beard
(74) *Attorney, Agent, or Firm* — Blank Rome LLP

(57) ABSTRACT

A method and user interface for direct setting of black and white points. Black point is set using a slider and matching of gray shades. White point setting is performed by having a setting object move within a defined region, such as a square or circle, with the area where the setting object moves being adjusted dynamically based on the location of the setting object with respect to the defined region. When the area is the desired white, the setting is complete. Preferably the defined region has a varying color border to allow a reference for the user in moving the setting object. A more detailed setting of gray levels can be accomplished by providing a gray scale with reference points. Each reference point has an associated white point setting area, so that settings are developed for each reference point. Settings at other locations are determined by interpolation or extrapolation.

20 Claims, 16 Drawing Sheets
(16 of 16 Drawing Sheet(s) Filed in Color)

(51) Int. Cl.
  *G09G 5/10* (2006.01)
  *G09G 3/20* (2006.01)
  *G09G 5/02* (2006.01)
  *H04N 9/31* (2006.01)
  *H04N 9/73* (2006.01)
  *H04N 1/60* (2006.01)

(56) References Cited

U.S. PATENT DOCUMENTS

| | | | | |
|---|---|---|---|---|
| 5,479,206 A * | 12/1995 | Ueno | H04N 1/00236 | 348/143 |
| 5,483,259 A * | 1/1996 | Sachs | H04N 17/02 | 345/594 |
| 5,499,040 A * | 3/1996 | McLaughlin | G06F 3/04842 | 345/904 |
| 5,617,114 A * | 4/1997 | Bier | G06F 3/0481 | 345/634 |
| 5,619,347 A * | 4/1997 | Taniguchi | H04N 9/735 | 348/223.1 |
| 5,726,672 A * | 3/1998 | Hernandez | G06F 3/04897 | 345/22 |
| 5,798,752 A * | 8/1998 | Buxton | G06F 3/038 | 345/157 |
| 6,043,909 A * | 3/2000 | Holub | G01J 3/50 | 348/E17.004 |
| 6,268,867 B1 * | 7/2001 | Sato | H04N 1/6019 | 345/589 |
| 6,563,534 B1 * | 5/2003 | Shimizu | H04N 5/202 | 348/211.14 |
| 6,697,079 B2 * | 2/2004 | Rose | G09G 5/02 | 345/593 |
| 6,950,551 B2 | 9/2005 | Murashita | | |
| 7,057,650 B1 * | 6/2006 | Sakamoto | H04N 1/3871 | 348/218.1 |
| 7,102,648 B1 * | 9/2006 | Holub | G06F 3/14 | 345/589 |
| 7,180,524 B1 * | 2/2007 | Axelrod | G01J 3/522 | 345/593 |
| 7,190,372 B2 | 3/2007 | Choi | | |
| 7,215,813 B2 * | 5/2007 | Graves | G06T 5/009 | 345/594 |
| 7,417,671 B2 * | 8/2008 | Sugimori | H04N 1/6011 | 348/223.1 |
| 7,471,823 B2 * | 12/2008 | Ubillos | G06T 5/009 | 345/594 |
| 7,495,679 B2 * | 2/2009 | Chou | H04N 9/69 | 345/690 |
| 7,502,033 B1 * | 3/2009 | Axelrod | G09G 5/06 | 345/440 |
| RE42,089 E | 2/2011 | Holmes | | |
| 7,969,478 B1 * | 6/2011 | Chen | H04N 5/58 | 348/223.1 |
| 8,022,964 B2 * | 9/2011 | Pettigrew | G09G 5/06 | 345/419 |
| 8,159,503 B2 * | 4/2012 | Park | G09G 5/003 | 345/589 |
| 8,279,236 B2 * | 10/2012 | Holub | G06F 3/14 | 345/589 |
| 8,326,035 B2 * | 12/2012 | Ubillos | G06T 5/009 | 345/594 |
| 8,433,134 B2 * | 4/2013 | Ishii | G06T 11/001 | 348/222.1 |
| 8,468,465 B2 * | 6/2013 | Warner | G06F 3/04847 | 707/609 |
| 8,593,480 B1 * | 11/2013 | Ballestad | H04N 1/6027 | 345/590 |
| 8,665,289 B2 | 3/2014 | Holub | | |
| 8,743,139 B2 * | 6/2014 | Pettigrew | G06T 11/001 | 345/419 |
| 8,823,726 B2 * | 9/2014 | Pettigrew | H04N 9/73 | 345/589 |
| 8,842,911 B2 * | 9/2014 | Pettigrew | H04N 1/60 | 382/162 |
| 8,854,370 B2 * | 10/2014 | Bryant | G11B 27/034 | 345/440 |
| 9,105,121 B2 * | 8/2015 | Ubillos | G09G 5/026 | |
| 9,299,168 B2 * | 3/2016 | Ubillos | G06T 11/001 | |
| 9,530,342 B2 * | 12/2016 | Bell | G09G 3/2003 | |
| 9,530,362 B2 * | 12/2016 | Chen | G09G 3/2003 | |
| 9,734,635 B1 * | 8/2017 | Gorumkonda | G06T 19/006 | |
| 9,749,503 B2 * | 8/2017 | Tomono | H04N 1/628 | |
| 2002/0039095 A1 * | 4/2002 | Nakano | G09G 5/00 | 345/204 |
| 2002/0130884 A1 * | 9/2002 | Rose | G09G 5/02 | 345/594 |
| 2002/0180999 A1 * | 12/2002 | Kanai | G09G 3/002 | 358/1.9 |
| 2003/0016866 A1 * | 1/2003 | Cooper | H04N 1/622 | 382/167 |
| 2003/0020725 A1 * | 1/2003 | Matsuda | G09G 5/00 | 345/600 |
| 2003/0103057 A1 * | 6/2003 | Graves | G06T 5/009 | 345/589 |
| 2003/0122806 A1 * | 7/2003 | Edge | H04N 1/6011 | 345/204 |
| 2003/0179211 A1 * | 9/2003 | Wada | H04N 9/73 | 345/589 |
| 2003/0179347 A1 * | 9/2003 | Tomiya | H04N 9/3114 | 353/39 |
| 2004/0046939 A1 * | 3/2004 | Nakamura | G03B 42/08 | 353/7 |
| 2004/0051790 A1 * | 3/2004 | Tamaru | H04N 5/202 | 348/223.1 |
| 2004/0066392 A1 * | 4/2004 | Ueda | G06T 11/00 | 345/629 |
| 2004/0070565 A1 * | 4/2004 | Nayar | G06K 9/4661 | 345/156 |
| 2004/0169741 A1 * | 9/2004 | Hayashi | H04N 1/32101 | 348/231.3 |
| 2004/0189657 A1 * | 9/2004 | Ikeda | G09G 5/006 | 345/589 |
| 2004/0196250 A1 * | 10/2004 | Mehrotra | G09G 5/02 | 345/102 |
| 2005/0134699 A1 * | 6/2005 | Nagashima | G02B 13/0055 | 348/218.1 |
| 2005/0134900 A1 * | 6/2005 | Kuwata | H04N 1/3871 | 358/1.15 |
| 2005/0200868 A1 * | 9/2005 | Yoshida | H04N 1/6077 | 358/1.9 |
| 2005/0213125 A1 * | 9/2005 | Smith | G06T 5/009 | 358/1.9 |
| 2005/0213128 A1 * | 9/2005 | Imai | H04N 1/6077 | 358/1.9 |
| 2005/0219420 A1 * | 10/2005 | Kimura | G09G 5/02 | 348/655 |
| 2005/0259225 A1 * | 11/2005 | Greenberg | G02B 26/008 | 353/31 |
| 2006/0028483 A1 * | 2/2006 | Kondo | G09G 5/02 | 345/594 |
| 2006/0044411 A1 * | 3/2006 | Ito | H04N 9/735 | 348/223.1 |
| 2006/0067673 A1 * | 3/2006 | Tanaka | G03B 17/48 | 396/429 |
| 2006/0103728 A1 * | 5/2006 | Ishigami | H04N 1/6027 | 348/180 |
| 2006/0158529 A1 * | 7/2006 | Katagiri | H04N 3/155 | 348/222.1 |
| 2006/0206811 A1 * | 9/2006 | Dowdy | G09F 23/00 | 715/201 |
| 2006/0279839 A1 * | 12/2006 | May | G03B 21/56 | 359/443 |
| 2007/0030453 A1 * | 2/2007 | Hoffman | H04N 9/3182 | 352/166 |
| 2007/0126934 A1 * | 6/2007 | Miura | H04N 9/73 | 348/655 |
| 2007/0171440 A1 * | 7/2007 | Yoshida | G06T 5/009 | 358/1.9 |

(56) References Cited

U.S. PATENT DOCUMENTS

| | | | |
|---|---|---|---|
| 2007/0216876 A1* | 9/2007 | Narikawa | H04N 9/3182 353/84 |
| 2008/0181494 A1* | 7/2008 | Watanabe | H04N 1/60 382/167 |
| 2008/0198179 A1* | 8/2008 | Doser | H04N 9/3114 345/690 |
| 2008/0232684 A1* | 9/2008 | Harada | G06K 9/2018 382/165 |
| 2008/0266316 A1* | 10/2008 | Takahashi | G09G 5/02 345/590 |
| 2008/0279451 A1* | 11/2008 | Shimbaru | G06F 3/13 382/167 |
| 2009/0195524 A1* | 8/2009 | Shen | G09G 5/00 345/207 |
| 2009/0207273 A1* | 8/2009 | Shirahama | H04N 5/16 348/223.1 |
| 2010/0020117 A1* | 1/2010 | Tanizoe | G09G 5/005 345/690 |
| 2010/0149204 A1* | 6/2010 | Han | G09G 5/02 345/589 |
| 2010/0182335 A1* | 7/2010 | Holub | G06F 3/14 345/590 |
| 2010/0289962 A1* | 11/2010 | Kim | G09G 5/02 348/649 |
| 2011/0057948 A1* | 3/2011 | Witt | G06T 1/00 345/593 |
| 2011/0090265 A1* | 4/2011 | Muroi | G09G 3/3413 345/690 |
| 2011/0096103 A1* | 4/2011 | Kato | H04N 9/73 345/690 |
| 2011/0102632 A1* | 5/2011 | Tsukagoshi | H04N 9/735 348/223.1 |
| 2011/0199541 A1* | 8/2011 | Fujine | G09G 5/02 348/577 |
| 2012/0013632 A1* | 1/2012 | Yamamoto | G09G 5/00 345/589 |
| 2012/0036480 A1* | 2/2012 | Warner | G06F 3/04847 715/833 |
| 2012/0044256 A1* | 2/2012 | Ide | G06F 3/0481 345/619 |
| 2012/0057044 A1* | 3/2012 | Shimizu | H04N 9/735 348/223.1 |
| 2012/0163716 A1* | 6/2012 | Kishimoto | H04N 1/6058 382/167 |
| 2012/0182276 A1* | 7/2012 | Kee | G09G 5/10 345/207 |
| 2012/0206475 A1* | 8/2012 | Bryant | G11B 27/034 345/589 |
| 2012/0210229 A1* | 8/2012 | Bryant | H04N 9/73 715/723 |
| 2012/0236042 A1* | 9/2012 | Parmar | G09G 3/3466 345/690 |
| 2013/0201224 A1* | 8/2013 | Kang | H04N 9/73 345/690 |
| 2013/0215360 A1* | 8/2013 | Pollack | G09G 3/3413 349/61 |
| 2013/0226495 A1* | 8/2013 | Marcu | G02F 1/1309 702/107 |
| 2013/0235069 A1* | 9/2013 | Ubillos | G09G 5/026 345/594 |
| 2013/0258073 A1* | 10/2013 | Kozak | G09G 3/003 348/56 |
| 2013/0307995 A1* | 11/2013 | Nakata | H04N 9/3194 348/189 |
| 2013/0314447 A1* | 11/2013 | Wu | G09G 5/02 345/690 |
| 2013/0314549 A1* | 11/2013 | Higuchi | H04N 17/04 348/175 |
| 2014/0092117 A1* | 4/2014 | Yoshimura | G09G 5/02 345/589 |
| 2014/0267785 A1* | 9/2014 | Chen | H04N 17/02 348/189 |
| 2014/0368551 A1* | 12/2014 | Chan | G09G 3/2003 345/690 |
| 2015/0010888 A1* | 1/2015 | Kinch | G09B 19/0023 434/104 |
| 2015/0070337 A1* | 3/2015 | Bell | G09G 3/2003 345/207 |
| 2015/0077587 A1* | 3/2015 | Kino | G09G 5/026 348/223.1 |
| 2015/0130827 A1* | 5/2015 | Mizushiro | H04N 9/3182 345/589 |
| 2015/0206468 A1* | 7/2015 | Wu | G06F 3/14 345/207 |
| 2015/0243227 A1* | 8/2015 | Park | G09G 3/3413 345/84 |
| 2015/0245043 A1* | 8/2015 | Greenebaum | H04N 19/98 375/240.25 |
| 2015/0310794 A1* | 10/2015 | Gille | H04N 9/73 345/594 |
| 2015/0331291 A1* | 11/2015 | Sakaigawa | G02F 1/134336 349/43 |
| 2016/0042531 A1* | 2/2016 | Nolan | H05B 37/036 348/135 |
| 2016/0078638 A1* | 3/2016 | Endo | H04N 1/60 382/167 |
| 2016/0140889 A1* | 5/2016 | Wu | G09G 3/2003 345/207 |
| 2016/0171955 A1* | 6/2016 | Yata | G09G 3/3607 345/601 |
| 2016/0180780 A1* | 6/2016 | Chen | G09G 3/2003 345/207 |
| 2016/0240125 A1* | 8/2016 | Sridharan | G09G 5/02 |
| 2016/0330492 A1* | 11/2016 | Eguchi | H04N 19/426 |
| 2016/0353088 A1* | 12/2016 | Liao | G02B 5/1842 |
| 2017/0018231 A1* | 1/2017 | Liu | G09G 3/3688 |
| 2017/0092180 A1* | 3/2017 | Cote | G09G 3/3225 |
| 2017/0124963 A1* | 5/2017 | Lu | G09G 3/2003 |
| 2017/0140556 A1* | 5/2017 | Safaee-Rad | G01J 3/505 |
| 2017/0206858 A1* | 7/2017 | Wu | G02F 1/13 |
| 2017/0230628 A1* | 8/2017 | Ichikawa | H04N 9/3182 |
| 2017/0263174 A1* | 9/2017 | Chen | G09G 3/2003 |
| 2017/0310922 A1* | 10/2017 | Dewa | H04N 5/58 |
| 2017/0330498 A1* | 11/2017 | Orio | G09G 3/2003 |
| 2017/0352329 A1* | 12/2017 | Imai | G09G 5/10 |
| 2018/0005560 A1* | 1/2018 | Itakura | G06T 1/00 |
| 2018/0137837 A1* | 5/2018 | Peana | G09G 5/10 |
| 2018/0259824 A1* | 9/2018 | Bouchard | G02F 1/167 |

* cited by examiner

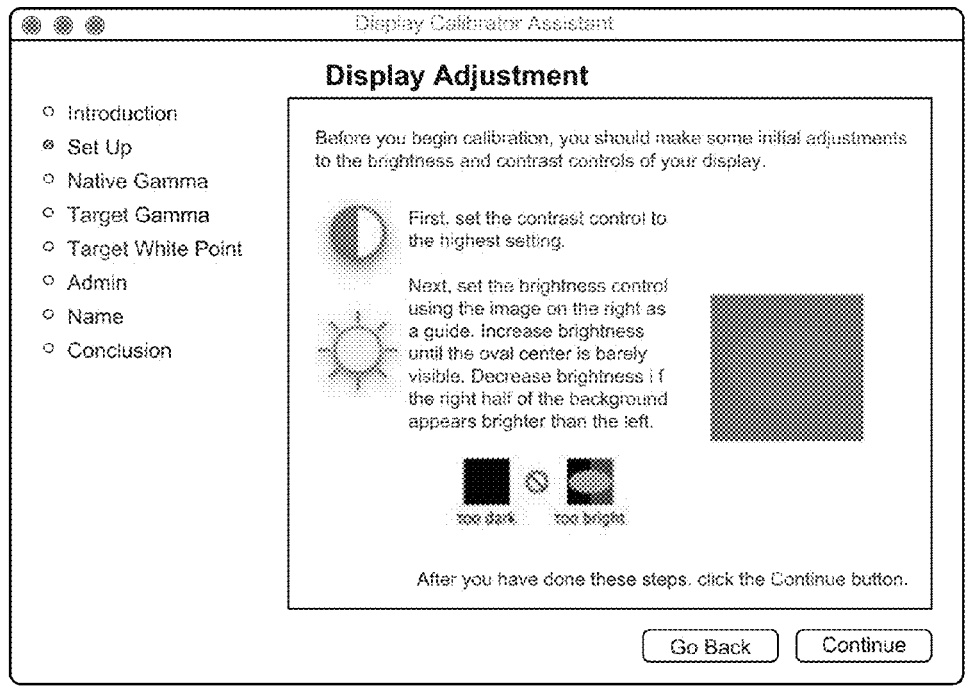
Fig. 10A
(Prior Art)
Fig. 10B
(Prior Art)
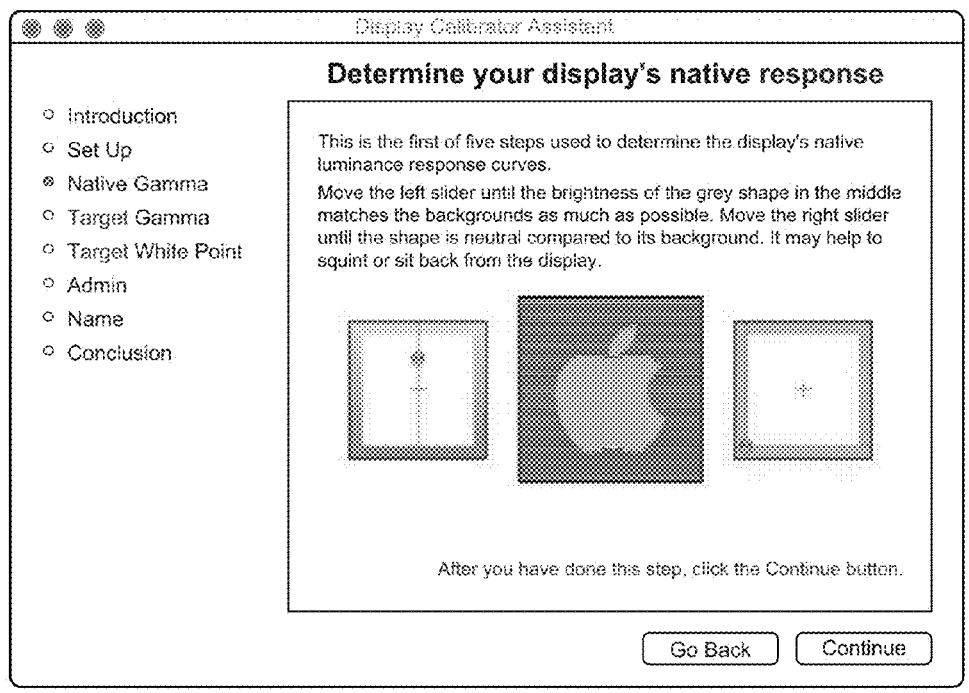

USER INTERFACE AND METHOD FOR DIRECTLY SETTING DISPLAY WHITE POINT

BACKGROUND OF THE INVENTION

1. Field of the Invention

The invention relates to setting color parameters for a computer display

2. Description of the Related Art

Modern computing devices such as cell phones, tablets, laptops and desktops with their associated monitors are prevalent today. Each of these devices has a display that is used to provide information to the user. In general, the devices use an internal red green blue (RGB) color space, which is then converted to RGB signals by a graphic processing unit (GPU), with the RGB signals provided to the display. Each particular display has its own individual characteristics for transforming received RGB signals into perceived colors. Indeed, individual devices of the same given model also slightly differ in this transformation. To avoid having wildly disparate perceived colors, it is conventional to do some form of calibration of the display. The calibration information is then utilized in providing the RGB signals to the display so that the perceived colors match across the various displays for a given internal RGB value. Conventionally this is done by the manufacturer of the particular display device and the calibration information is provided as an International Color Consortium (ICC) profile or a lookup table (LUT). The GPU uses the ICC profile or lookup table to do the transformation from the internal, generally linear, RGB color space, to the desired RGB levels so that uniform images are displayed.

However, the display itself is not the only element in perceiving color. The environment of the display is also a factor. For example, a room brightly lit by florescent lighting will cause the display to have a different tone than a room dimly lit by incandescent lighting, which will also have a different tone than natural sunlight and so on. Each of these light sources has an effect on the perceived coloring of the image so that the light source should also be taken into account when developing the transforms or profile for a given display. Further complications are present in the case of a projector. While a proper projection screen is the best surface, often a room wall is used for convenience. The color of that wall will also affect the displayed image, often to an amount greater than ambient light conditions.

There are several different ways to determine the ICC profile or LUT values. Generally the most accurate involves the use of a photometer which is placed on the display itself and which also receives the ambient light of the environment. A series of carefully controlled images are then displayed on the display and received by the photometer. Based on the signals provided by the photometer as compared to the known signal provided to the GPU, transformation values can be determined. Depending on the quality of the photometer, this is can be a very accurate method. The negatives of this process are that a) the photometer itself is needed, b) the process is generally relatively time-consuming and c) the resulting ICC profile or LUT values are only good for that specific display in that particular environment and then only for a given time, as displays change over time.

An alternative method to perform display calibration involves projecting various images onto the display and doing comparisons of various levels which are displayed by visual inspection. While this method does not provide for an absolute calibration to known reference standards, it also does not require a photometer. A first example of such a method is shown in FIGS. 9A-9D.

In FIG. 9A an initial screen is provided that requests the setting of the contrast and brightness of the display. FIG. 9B illustrates the next screen, which is used to determine the display's gamma value. Gamma correction adjusts an image for the difference between the eye's light sensitivity and that of the display or the numerical value of a pixel in an image file and the brightness of that pixel when viewed on the display. A slider is used to change displayed image until gray values are matching in the image. FIG. 9C then has selection of two particular gamma points. After selecting which of the two gamma points provides the most desired image, the white point of the display is then selected. The white point of a display is the color of white on the display, the RGB values that produce what is perceived as white. In the screen of FIG. 9D the user just selects a particular target white point and the setting is complete. While this simplified four step process is reasonably quick, it provides relatively little feedback for providing the most visually acceptable display.

FIGS. 10A-10P illustrate a more detailed method of determining the transformation values. The initial screen of FIG. 10A is the same as shown in FIG. 9A. A first measurement step is shown in FIG. 10B where two squares are provided next to an image. The left square is a slider for intensity and the right square is for tone correction. The slider is used to set brightness of the gray shape while the tone correction value adjustment is used to balance the color of the gray.

Variations based on changing the particular slider and tone correction values are shown in FIGS. 10C and 10D. Internal calculations are performed and utilized in a next step, where the same general inputs are requested as shown in FIG. 10E. The operation is repeated three more times as shown in FIGS. 10F-10I, with FIG. 10H showing effects of changing the tone correction value. FIGS. 10J-10L are a more detailed variation on selecting a gamma value. FIG. 10J illustrates the use of the gamma value that is provided by the manufacturer of the display, while FIGS. 10K and 10L illustrate the use of a slider to adjust the gamma values as desired. After the selection of target gamma by the user to the most desirable image, the white point is set as shown in FIGS. 10M-10O. Similar to the gamma adjustment, the white point can be set by using a native value or a slider value to adjust as desired by the user. FIG. 10P illustrates the resulting ICC profile which is utilized by the operating system and GPU to do the desired transformations from internal RGB through the display to the displayed image.

SUMMARY OF THE INVENTION

Preferred embodiments according to the present invention provide for direct setting of black and white points. Black point is set using a slider and matching of gray shades. White point setting is performed by having a setting object move within a defined region, such as a square or circle, with the area where the setting object moves being adjusted dynamically based on the location of the setting object with respect to the defined region. When the area is the desired white, the setting is complete. Preferably the defined region has a varying color border to allow a reference for the user in moving the setting object.

A more detailed setting of gray levels can be accomplished after setting the black and white points by providing a gray scale with reference points. Each reference point has an associated white point setting area, so that settings are developed for each reference point. Settings at other locations are determined by interpolation or extrapolation.

BRIEF DESCRIPTION OF THE FIGURES

The patent or application file contains at least one drawing executed in color. Copies of this patent or patent application publication with color drawing(s) will be provided by the Office upon request and payment of the necessary fee. The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Figure 1:
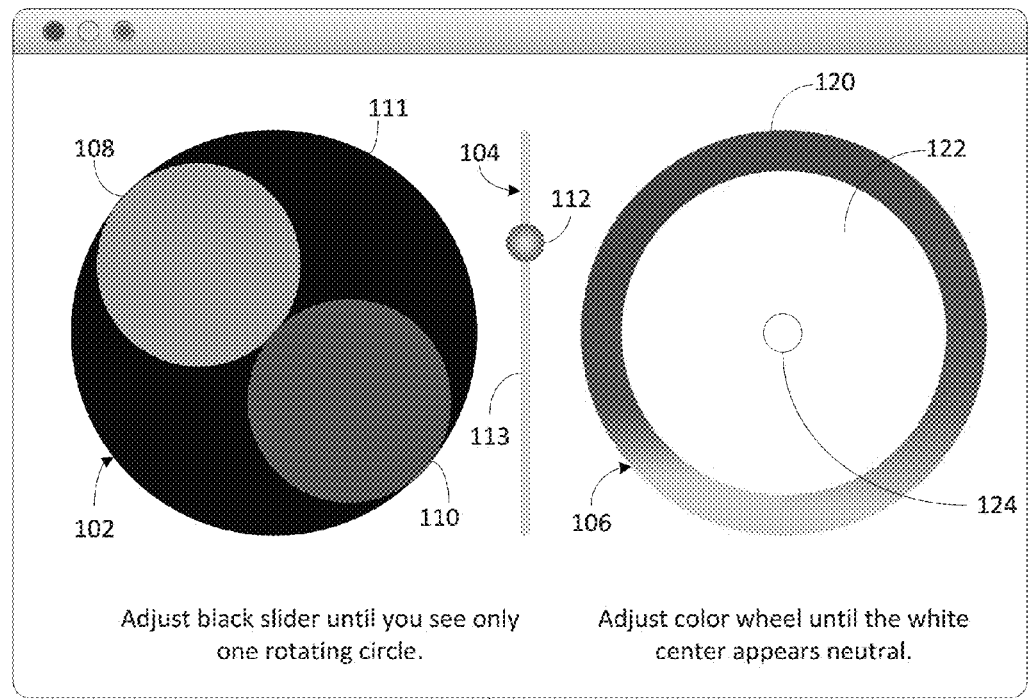
FIG. 1 is a screen display of a first embodiment of a user interface according to the present invention.

Referring now to FIG. 1, a first embodiment of a user interface according to the present invention is illustrated. A color adjustment program 726 (FIG. 7) causes the display of a window 100 containing a black point adjustment circle 102 and slider 104 and a white point adjustment circle 106 as illustrated. The black point adjustment circle 100 contains two smaller adjacent circles 108 and no on a larger black circle 111. The circle 108 is preferably a light gray shade, while the coloring of circle no is variable based on the location of the slider 104. The user sets the black level as a slider button 112 is moved up and down the path 113 of the slider 104 until the gray level of the circle no matches the black level of the circle 111.

The white point setting circle 106 has an outer ring 120 which includes a color spectrum, an inner white region 122 and an adjustment circle 124. The white region 122 has a base or internal color value of white, typically 255 for each of R, G and B. This provides the internal baseline used for the color corrections. The outer ring 120 in the illustrated embodiment is shaded yellow at 6 o'clock, red at 9 o'clock, purple at 11 o'clock, blue at 2 o'clock and green at 4 o'clock, with the appropriate intermediate shades between those colors so that a full RGB gradient is produced. The adjustment circle 124 is movable inside the outer ring 120 and its location causes an adjustment of the white point as will be illustrated below.

Figure 3:
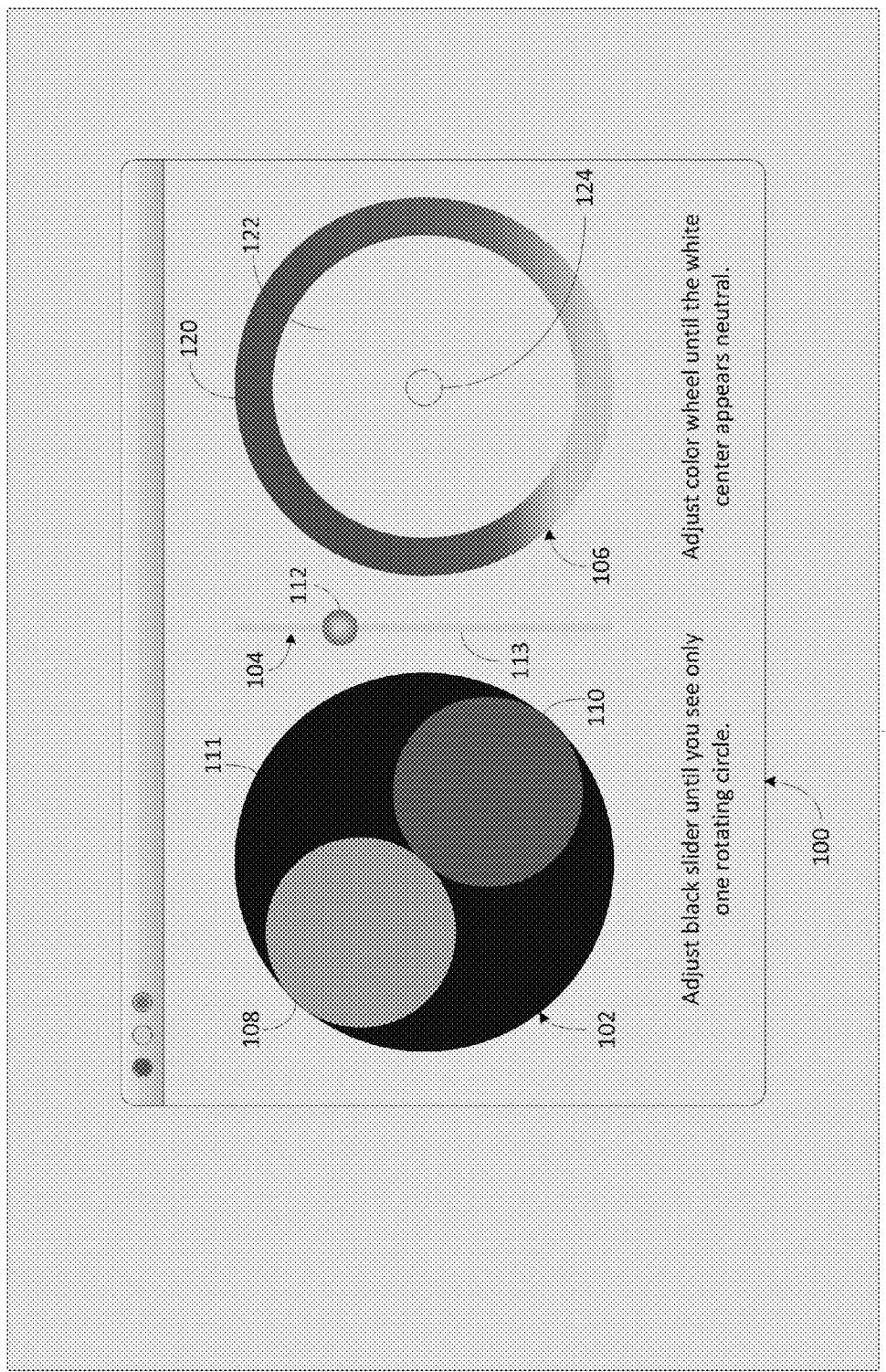
FIG. 3 is an example of the first embodiment projected on a colored surface.
Figure 4:
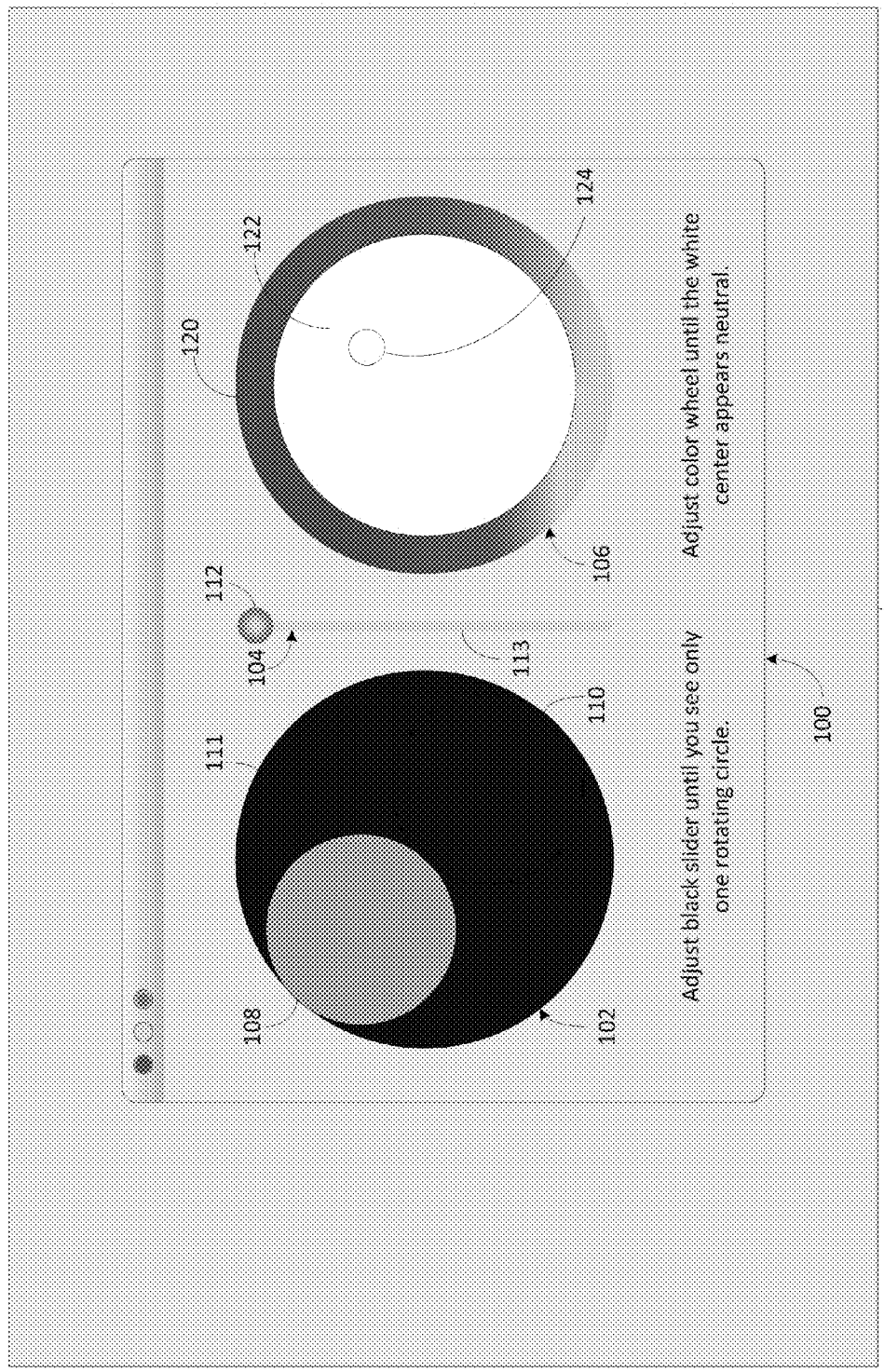
FIG. 4 is the example of FIG. 3 with user input applied to adjust the colors.

Operation of the first embodiment using window 100 is illustrated in FIG. 3. A background 310 is present which is a non-white background, in the illustration a light tan background. This would commonly be the case if a projector is being used to display the images and the wall on which the projector is displayed is a light tan colored wall. Because of the tan background 310 all of the colors in the window 100 will be distorted. For purposes of the illustration only the white portions have been distorted to the tan background. Therefore it would be desirable to recalculate and reset the white point to correlate for the tan background 310. Referring to FIG. 4, it is noted that the adjustment circle 124 has been moved from the center location of FIG. 3 to a new location slightly out from the center and in the 2 o'clock direction. This is done by a user selecting the adjustment circle 124 and moving it to a different location, the color adjustment program 726 interacting with the operating system 720 to allow this movement. Is also noted that the white region 122 which previously was tan in the illustration of FIG. 3 is now white. This occurs because the area in the white region 122 is being corrected or adjusted by the color adjustment program 726 with an additional color transformation to compensate for the tan background 310 being used for the projector. Using the circle 106 with the adjustment circle 124 provides a very quick and simple mechanism to adjust the white point to a desired level. The user only needs to move the adjustment circle 124 inside the white region 122 until the white region 122 is at the desired shade of white or as close as possible. Movement of the adjustment circle 124 causes different RGB transformations to be applied by the color adjustment program 726 to the displayed image portion. The colors of the outer ring 120 provide guidance on the movement of the adjustment circle 124, preferably to a point that is a complement to the background or environment factor. In the illustration, as the background 310 is tan, the adjustment circle 124 is moved away from red and towards blue and green. The color adjustment program 726 providing the window 100 monitors the RGB transformation values as the adjustment circle 124 is moved and applies the transforms to the image of the white region 122.

Figure 5:
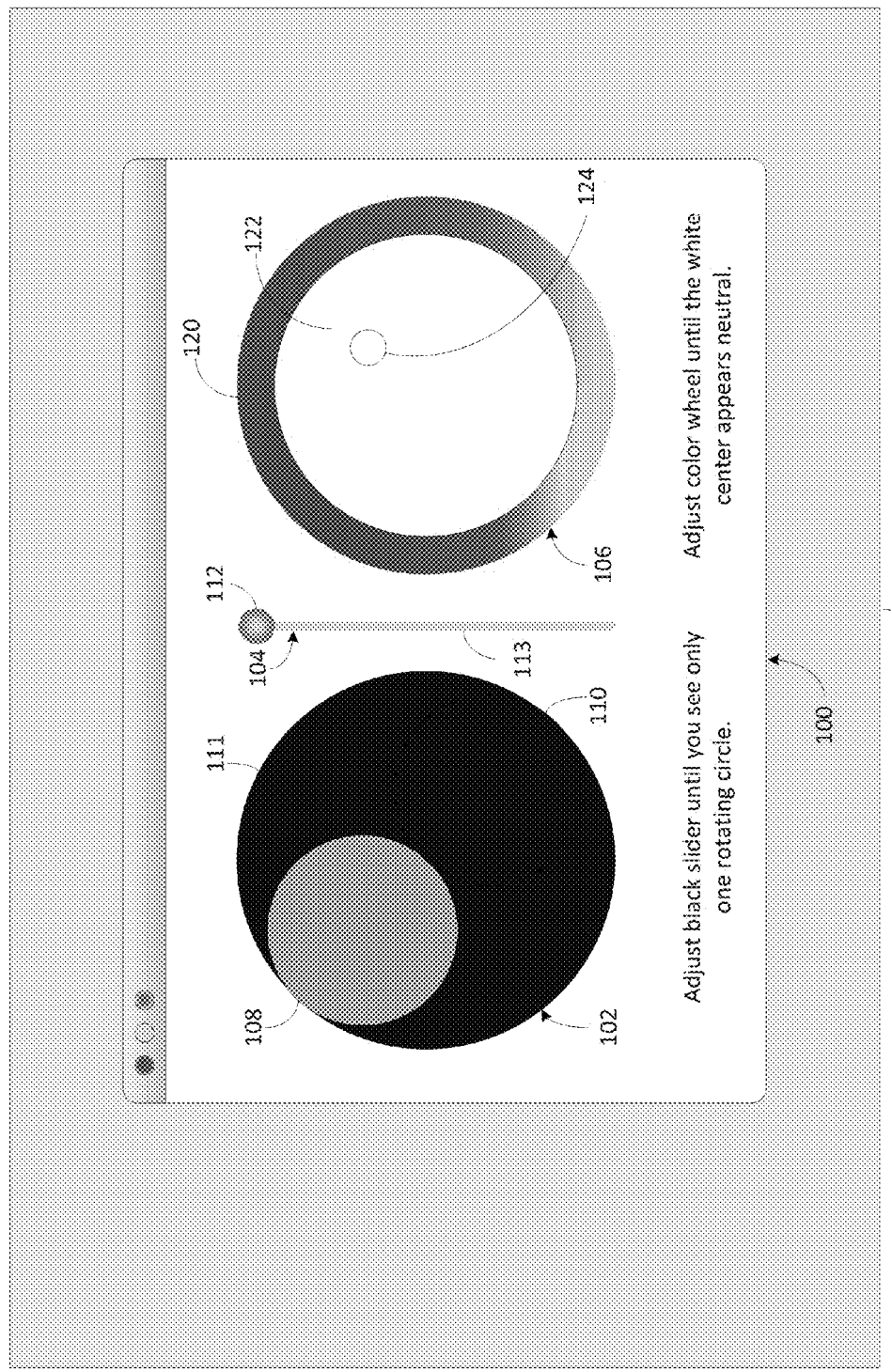
FIG. 5 is the example of FIG. 4 where the adjustment has been applied to the window.

Unlike the prior art where the white point was set with a slider that varied the white color only between warm and cool whites, not allowing corrections for greenish or purplish whites, the proposed method allows the white adjustments in a the complete two dimensional hue space. When the adjustment circle 124 is in the desired location so that the white region 122 is the desired white level, the color adjustment program 726 can be closed by the user and the corrections based on this latest adjustment are put into effect, so that the entire window 100 becomes white as shown in FIG. 5, as opposed to tan in FIG. 3.

As can be seen in FIG. 4, the black point has also been adjusted, with the slider button 112 moved to the top by the user and the circle no matching the circle 111. The color adjustment program 726 bases the black point setting on the slider button 112 location.

Figure 8:
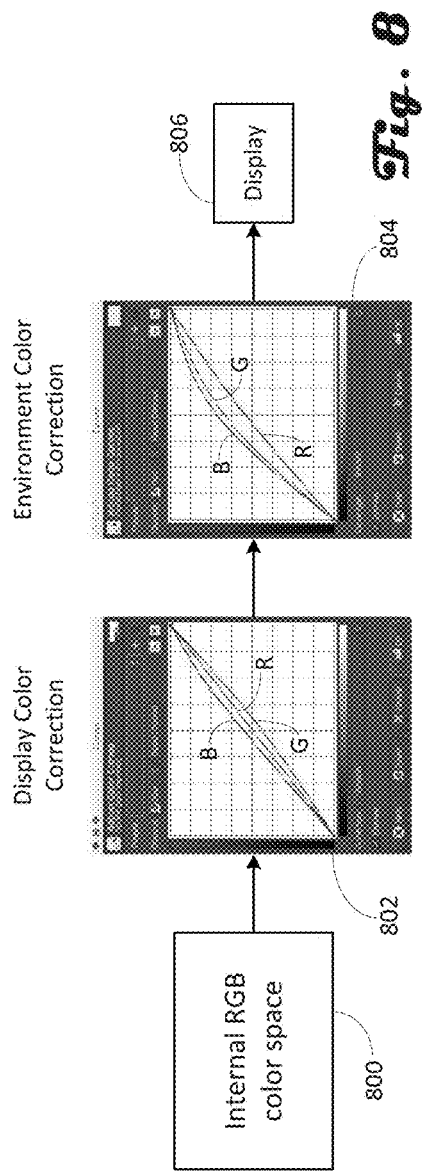
FIG. 8 is an illustration of transformation operations according to the present invention.
Figure 9A:
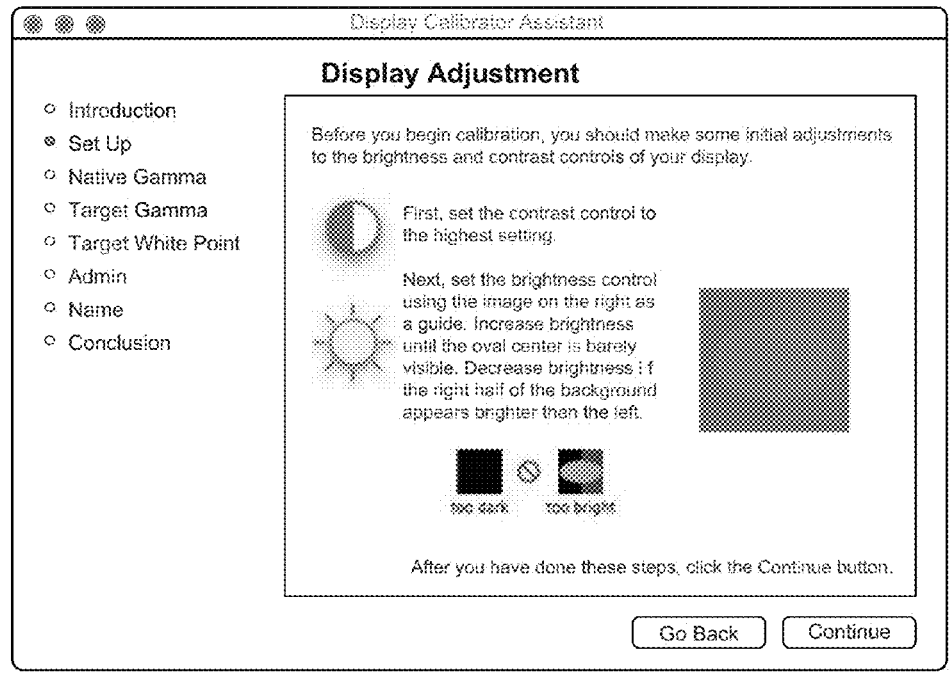
FIGS. 9A-9D are screen displays of a first embodiment according to the prior art.
Figure 9B:
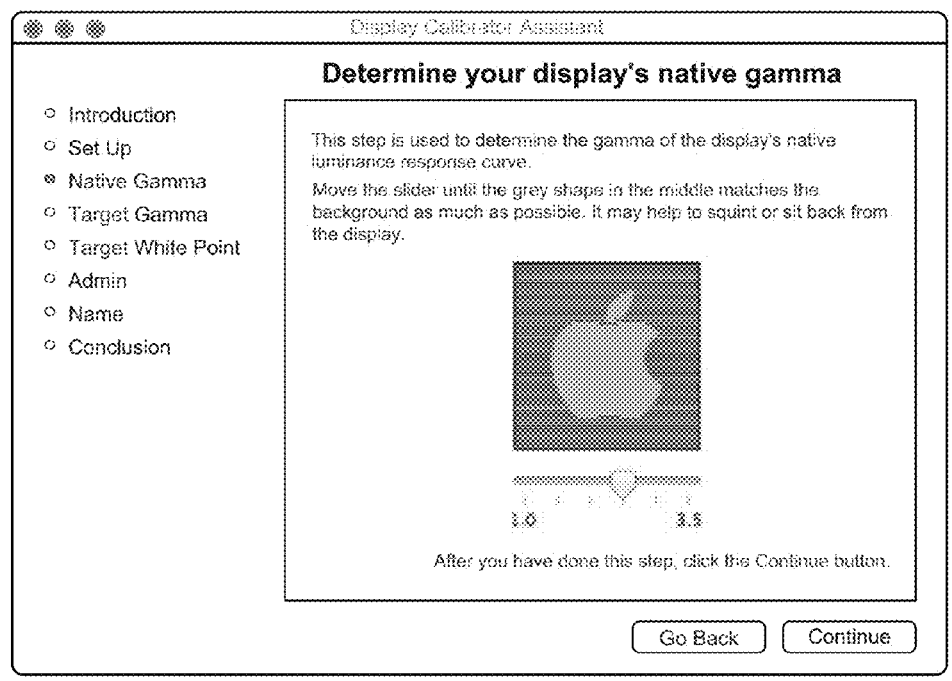
Figure 9C:
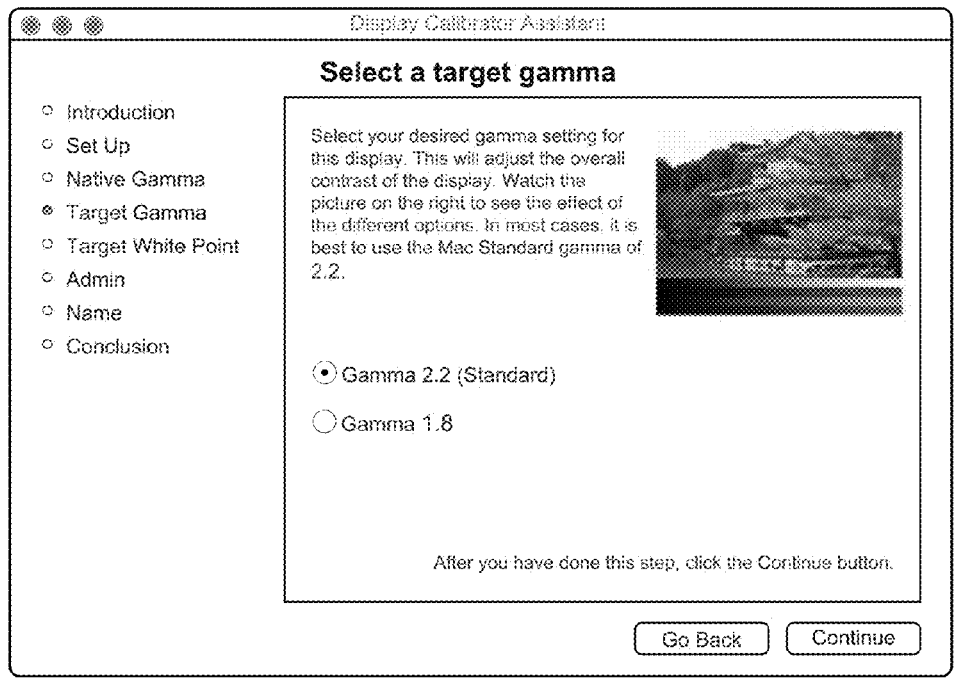
Figure 9D:
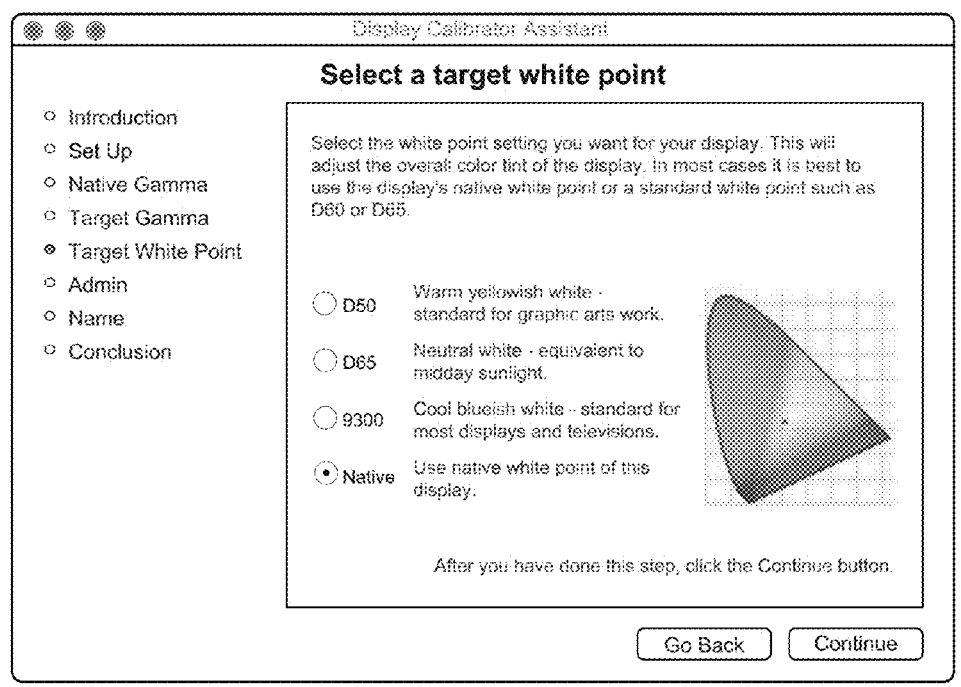
Figure 10C:
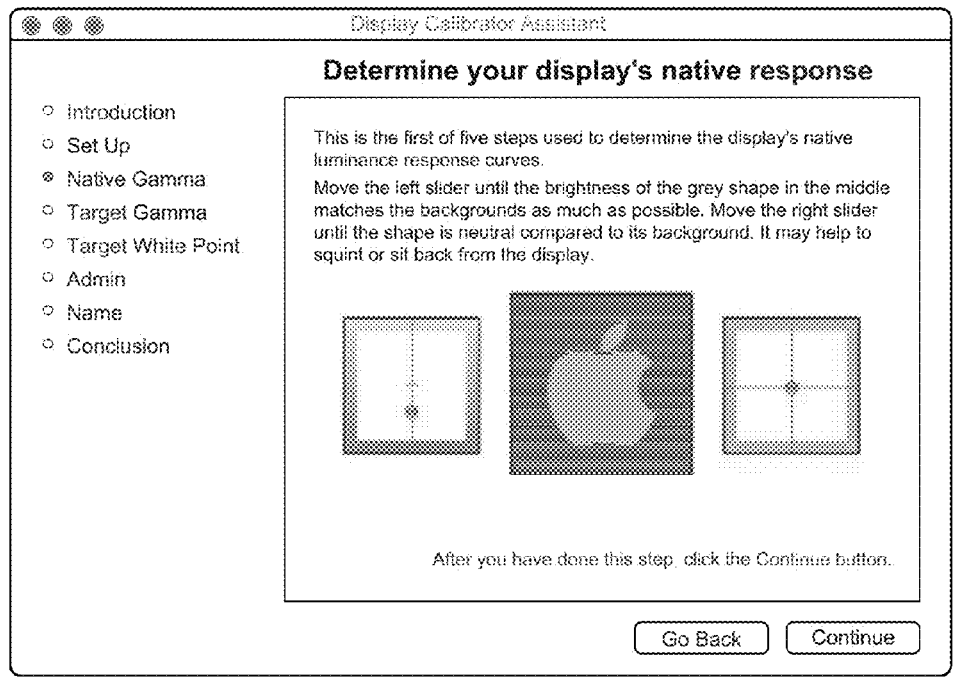
FIGS. 10A-10P are screen displays of a second embodiment according to the prior art.
Figure 10D:
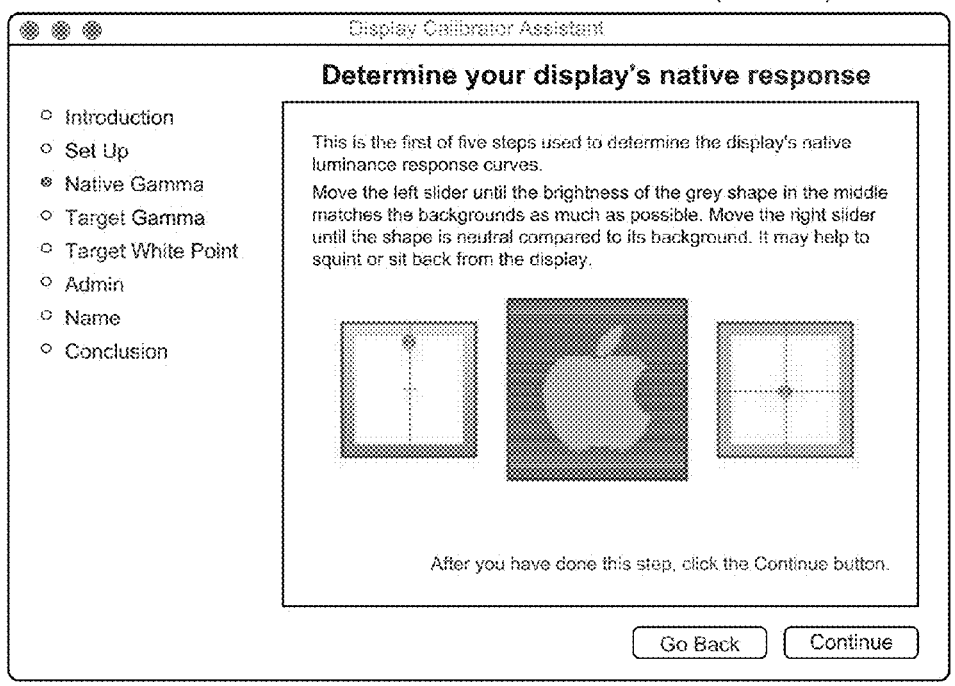
Figure 10E:
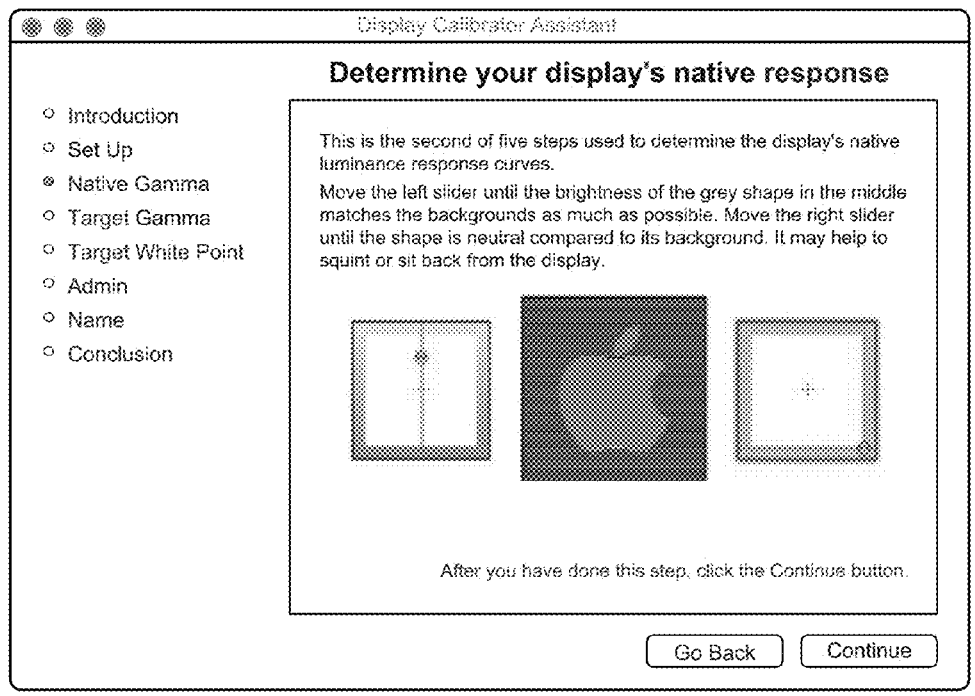
Figure 10F:
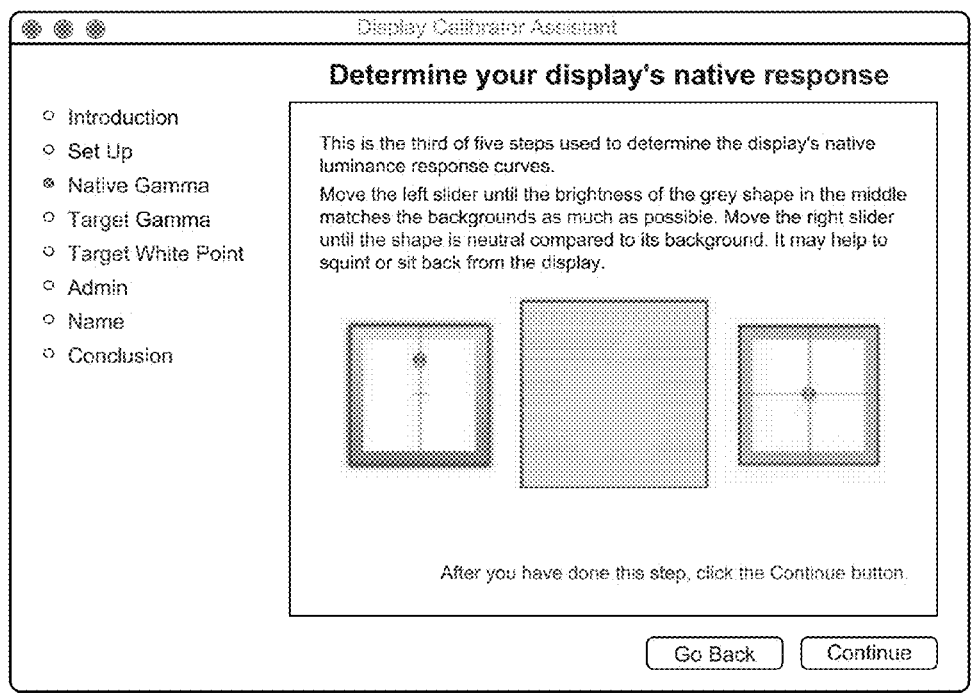
Figure 10G:
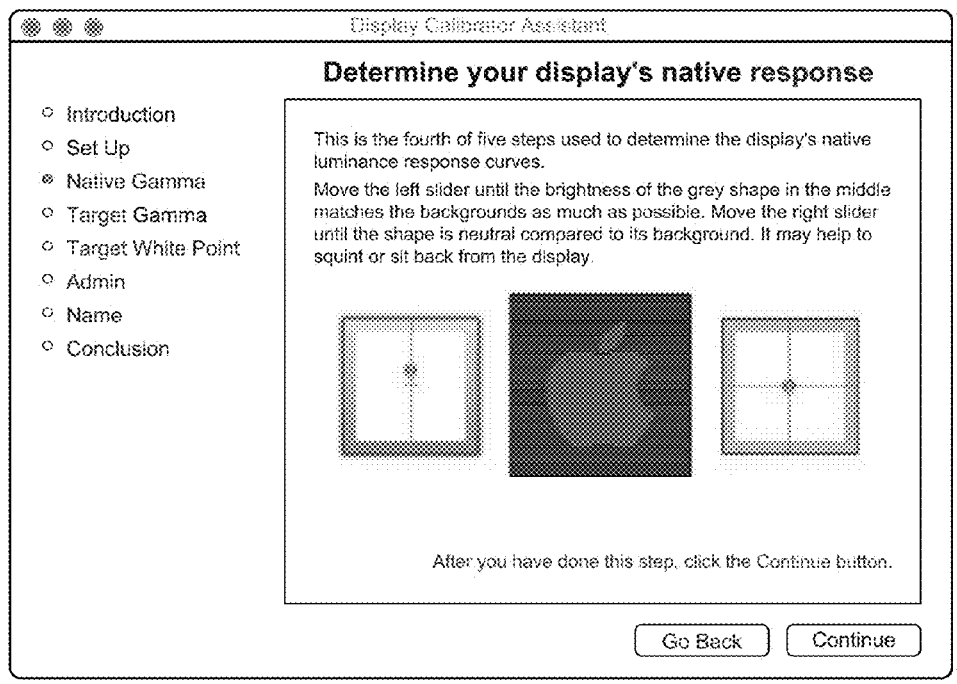
Figure 10H:
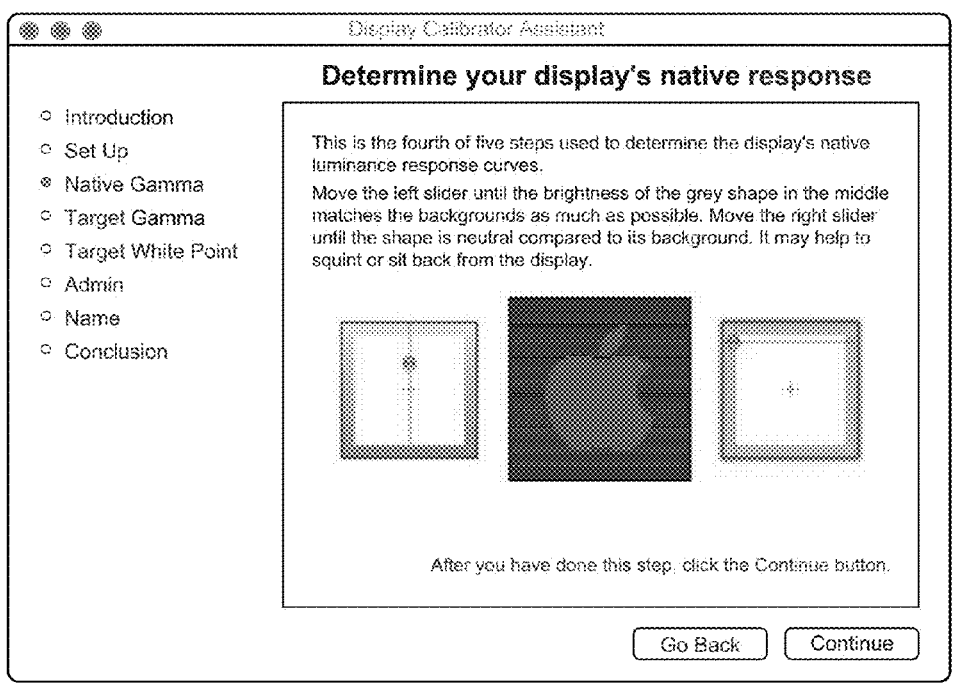
Figure 10I:
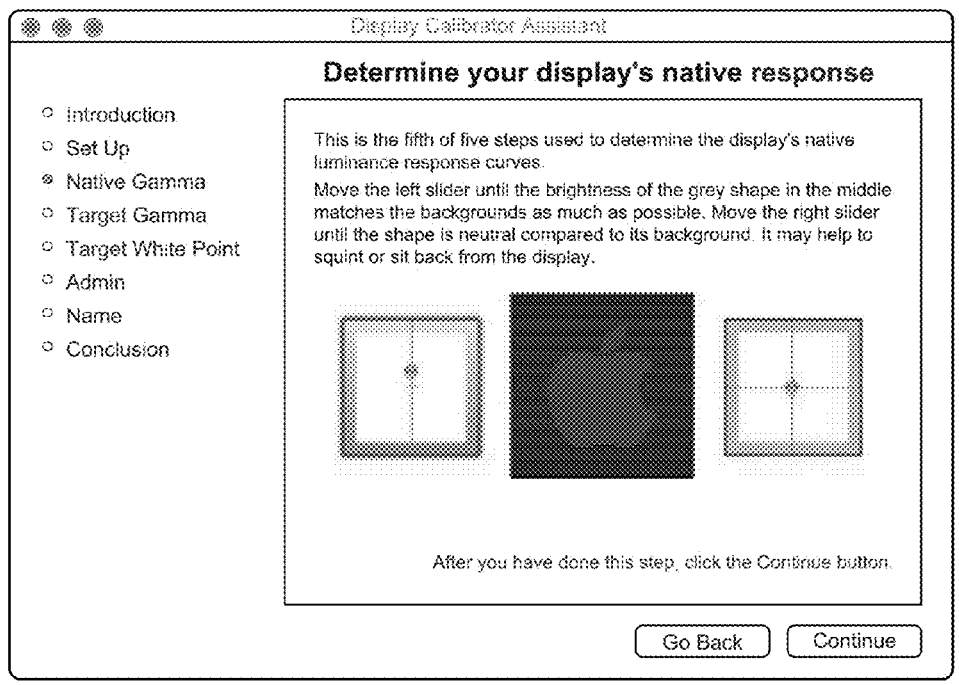
Figure 10J:
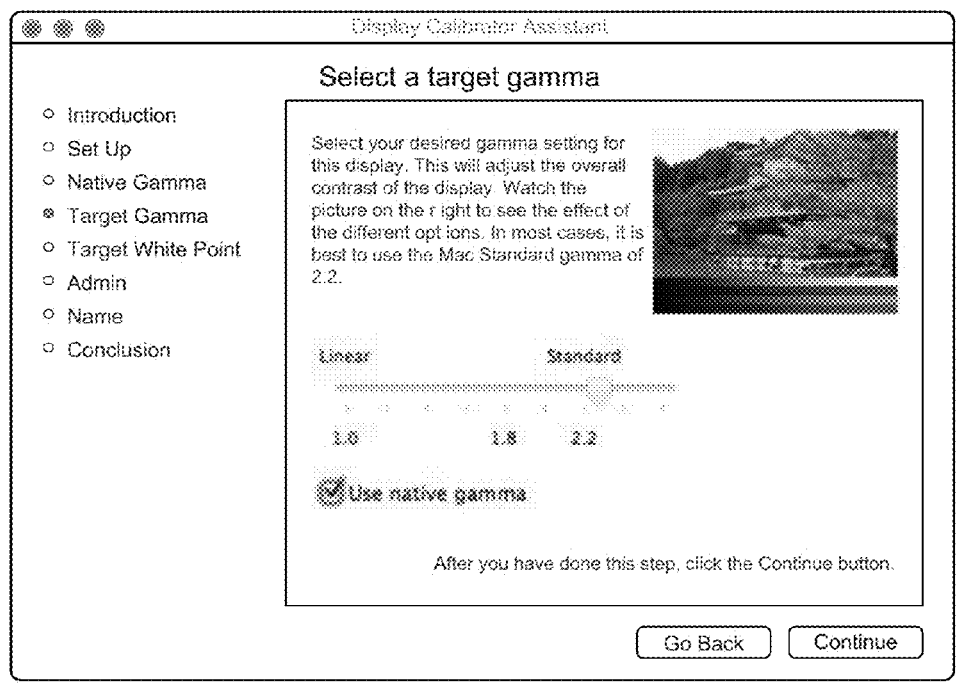
Figure 10K:
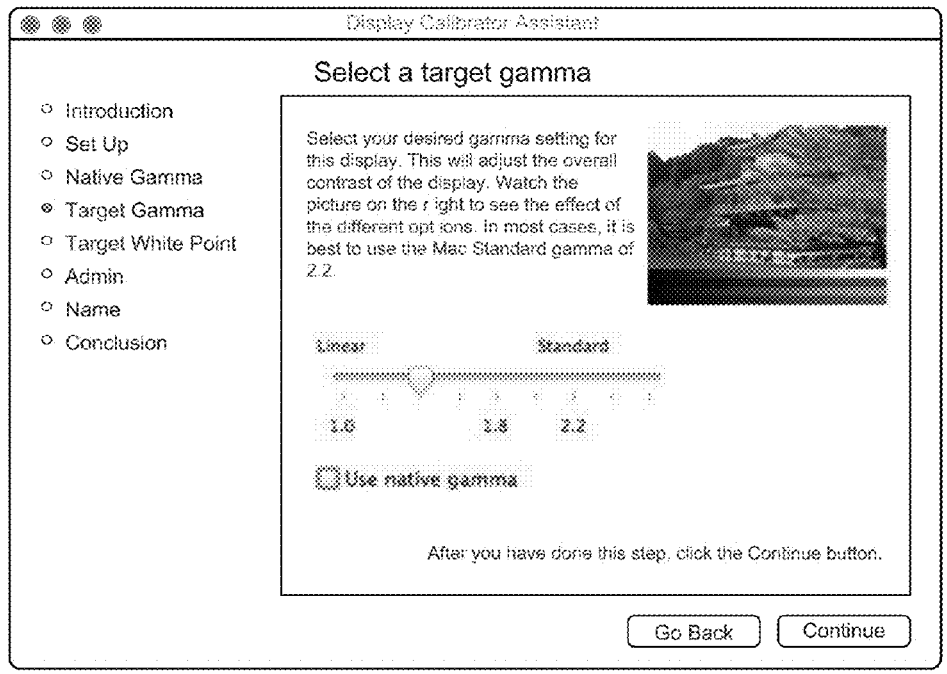
Figure 10L:
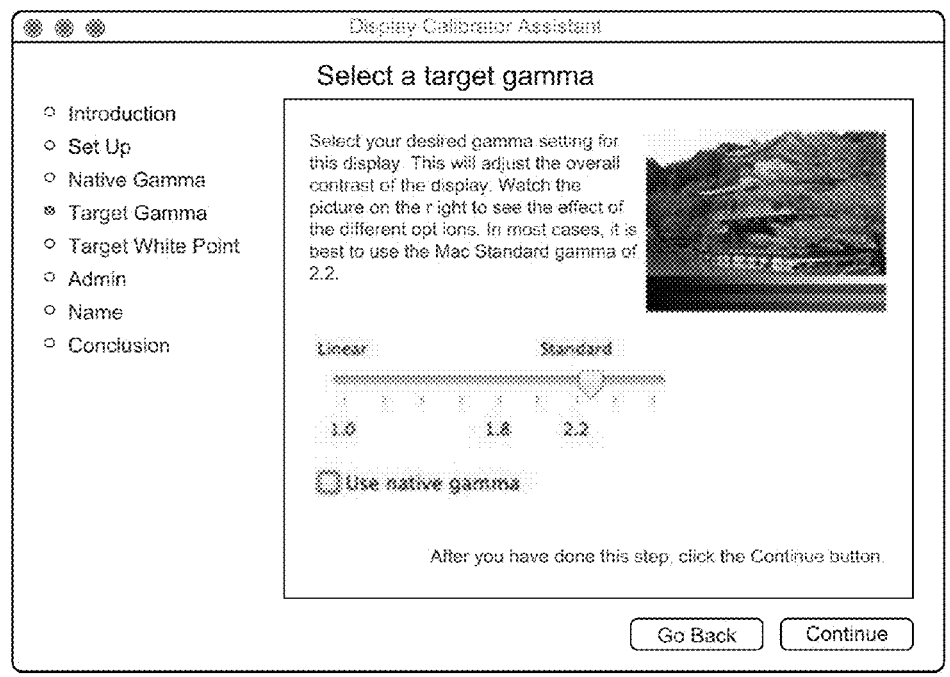
Figure 10M:
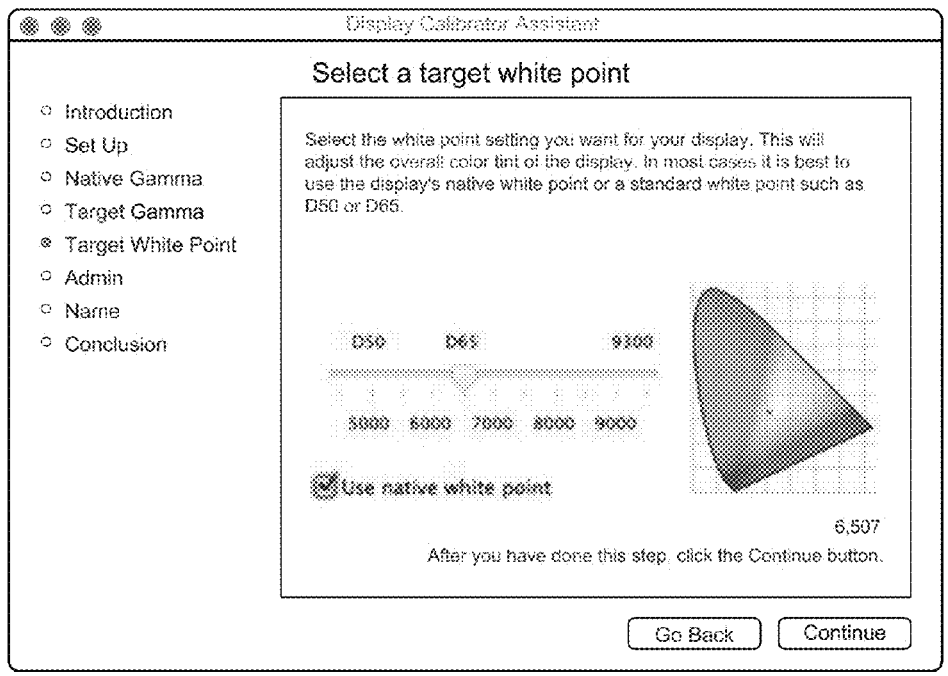
Figure 10N:
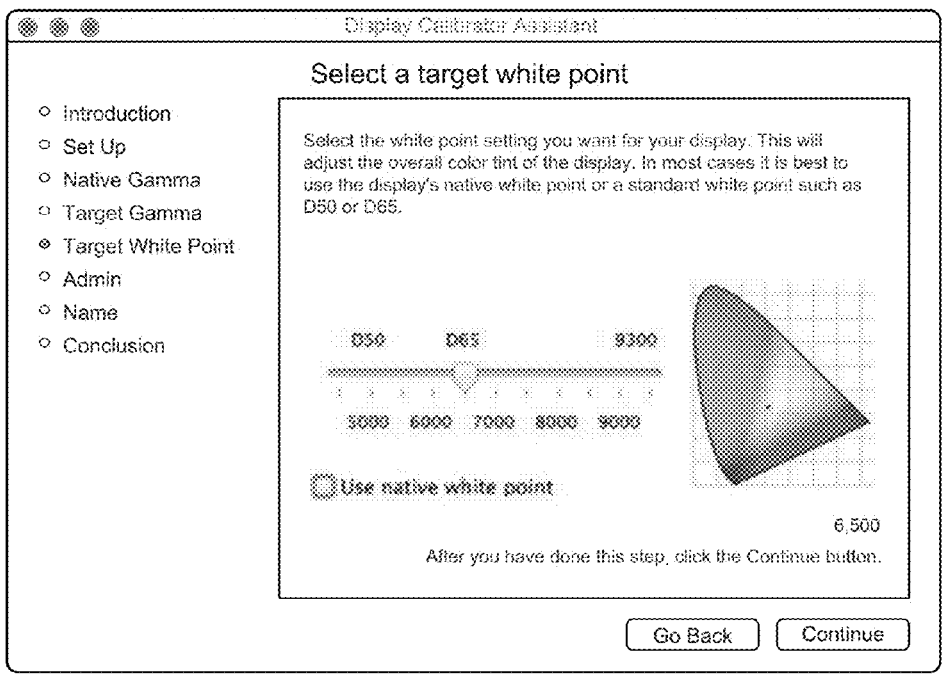
Figures 10O, 10P:
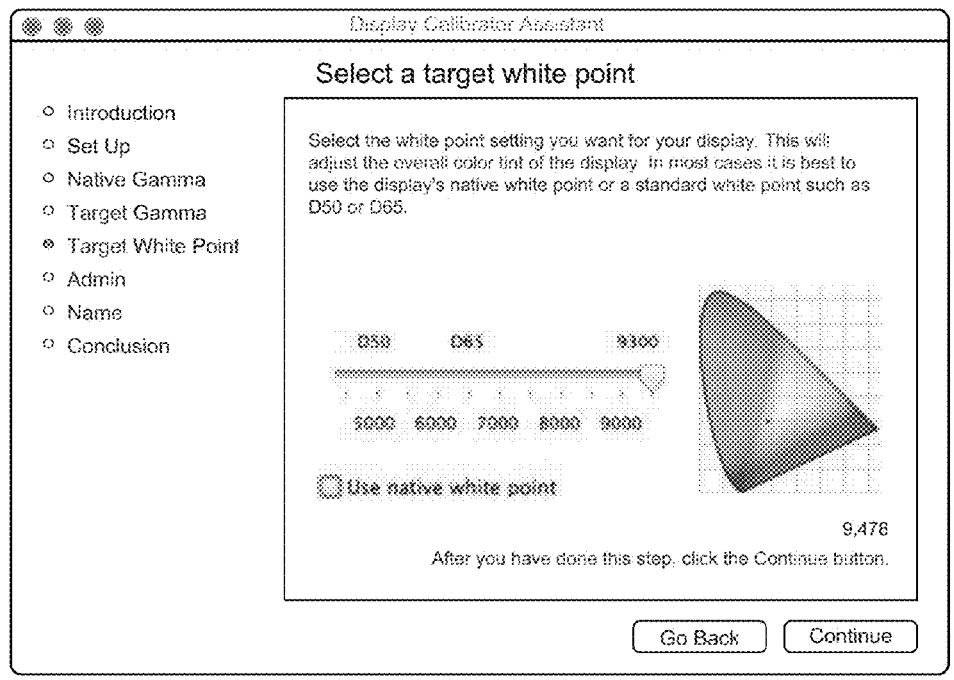

The color transformation is accomplished as shown in FIG. 8. Block 800 represents the internal RGB color space of the computing device, conventionally a linear RGB color space. Data in the color space 800 is transformed using a display color correction operation illustrated by the color curves 802. A color curve display is a visualization of adjustments between input and output color levels at particular intensities or shades. In the example of display color correction curves 802 it can be seen that in the center the blue is slightly elevated, the green is slightly depressed and the red is effectively unchanged. In normal use these curves are based on the correction or transformation determined by the display manufacturer or as previously developed in a prior calibration operation. The display corrected image is then transformed using an environment color correction developed using the window 100. An environment color correction curve 804 is illustrated. As can be seen, the blue and green levels are significantly enhanced and the red level is slightly enhanced in the illustration. These are the levels changes necessary to adjust the white region 122 in FIG. 4 so that it corrects for the tan background and provides a white region. As mentioned, this can in part be seen by the location of the adjustment circle 124, where it is significantly closer to the outer circle 120 in the green and blue regions and just above the stable level for the red area.

After processing for the environment color correction as illustrated by curves 804, the environmentally corrected image is provided to the display 806. This display 806 can be a projector as described with FIGS. 3, 4 and 5 or it can be an internal display as is common on a cell phone, tablet or laptop or it can be a connected monitor or television as would be common in a desktop computer and optional in laptop tablet and cell phones.

Figure 2:
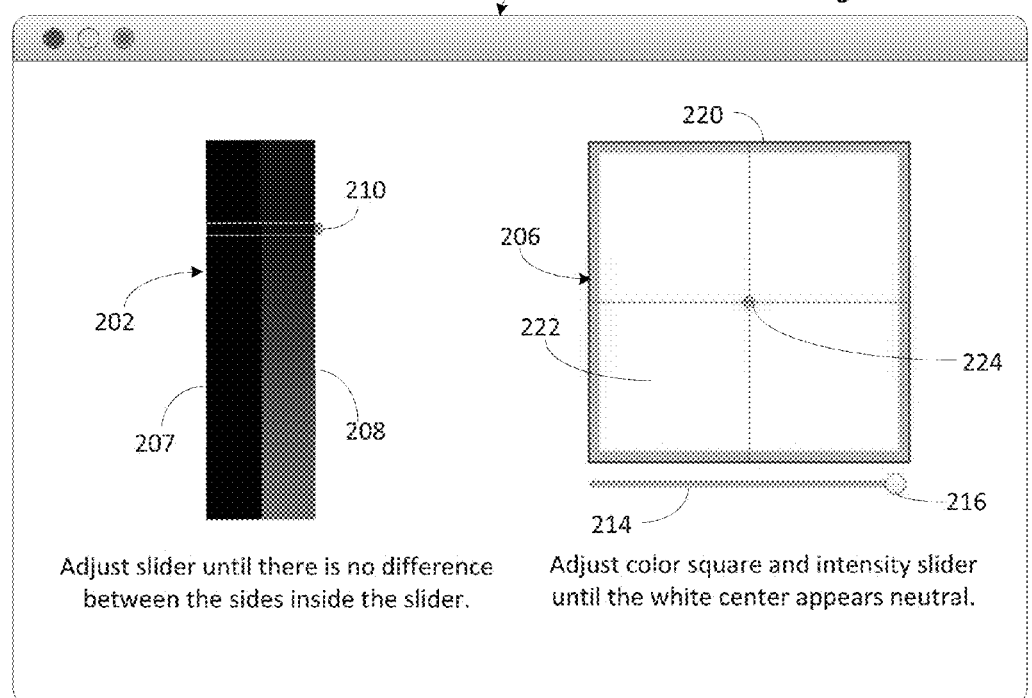
FIG. 2 is a screen display of a second embodiment of a user interface according to the present invention.

FIG. 2 is a second embodiment with window 200 presented by the color adjustment program 726. On the left is a black point adjustment slider 202 and on the right is a white point adjustment square 206. The black point adjustment slider 202 is divided into two portions, portion 207 on the left side and portion 208 on the right side. The left portion 207 is a uniform shade of black, while the right portion 208 is varying gradient of shades of gray, in the illustration from the darkest at the top to the lightest the bottom. A slider bar 210 is located over the portions 207 and 208 and the black level is set by the user sliding the slider bar 210 up and down until the right portion 208 visible through the slider bar 210 matches or is equal to the left portion 207 visible through the slider bar 210.

White point adjustment is made in a similar fashion as using circle 106 except that two different parameters are controllable. The square 206 controls the color balance while an intensity slider 214 with a slider button 216 is located below the square 206. The square 206 contains an outer ring 220, similar to the outer ring 120, which contains a color gradient area. A setting point 224 is located inside the outer ring 220 and is used to adjust the color balance. By appropriately moving the setting point 224 and adjusting the intensity slider 216 the white point as provided by a white region 222, similar to inner white region 122, can be set.

While the white region 122 or 222 is shown inside the outer ring 120 or 220 in the illustrated embodiments, it is understood that the white region 122 or 222 can be provided at locations outside of the out ring 120 or 220 if desired, the movement of the adjustment circle 124 or setting point 224 inside the outer ring 120 or 220 still controlling the adjustments made to the white region 122 or 222.

It is also understood that while the first embodiment uses a circle for the outer ring 120 and the second embodiment uses a square for the outer ring 220, other geometric shapes can be used if desired, such as regular shapes like hexagons, octagons and the like or irregular shapes such as logo outlines and the like.

Figure 6:
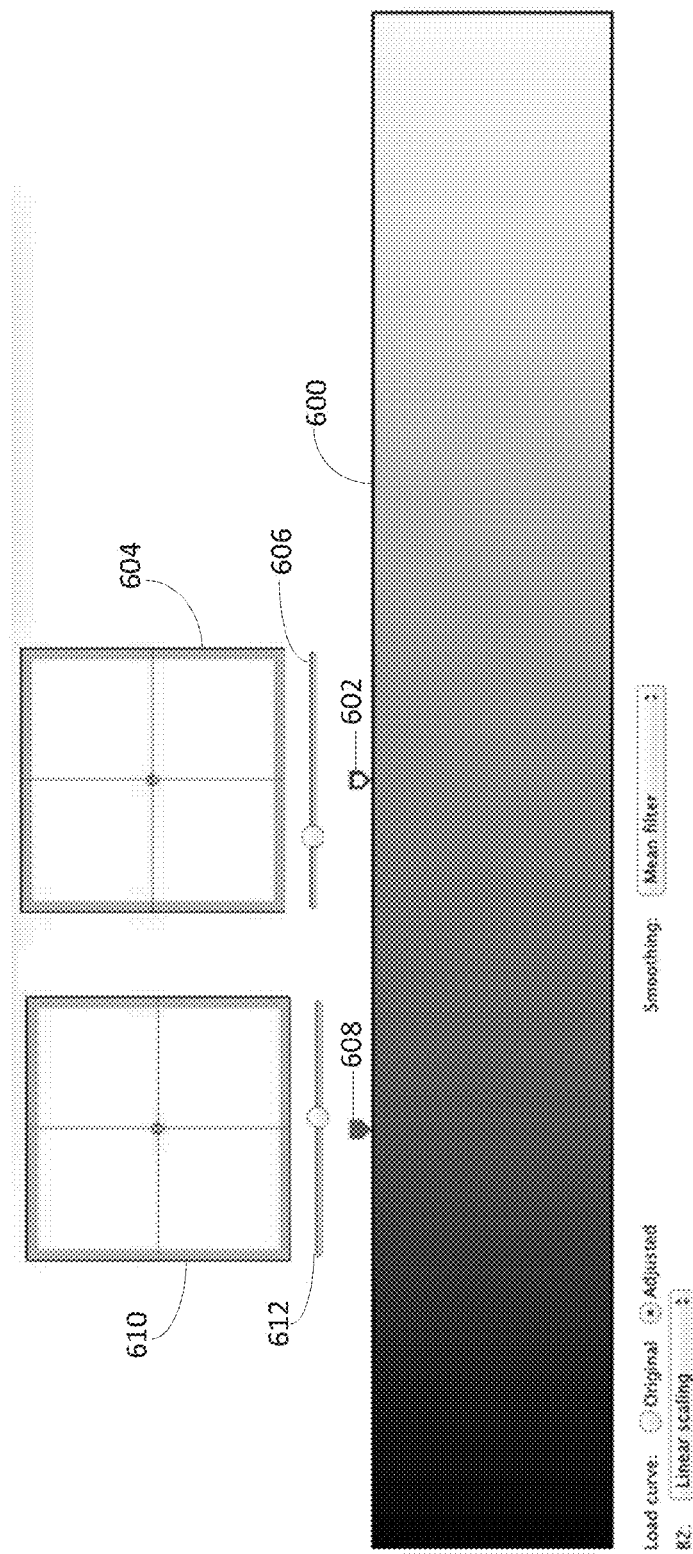
FIG. 6 is a screen display of a third embodiment according to the present invention.

The embodiments of FIGS. 1 and 2 are very simple to allow quick adjustment of the color levels. If a more detailed adjustment at various intensity levels and the like is required, operation of the color adjustment program 726 as shown in FIG. 6 can be utilized. Operation using the display of FIG. 6 provides for gray tracking adjustment in addition to the black and white level settings already done using the embodiments of FIGS. 1 and 2. By having the black and white points already set, the gray tracking adjustments do not change the black and white point settings. A rectangle 600 containing a gray ramp is illustrated for determining gray adjustment levels. Initially a center value is utilized to begin adjustments and a chromatic adjustment 604 and an intensity adjustment 606, the same as that used in FIG. 2 for purposes of illustration, is provided for that gray level. The intensity and chromatic correction at that gray level is adjusted as desired so that the white region is the proper white level as discussed above. The user then selects an additional control point to be added to the display, in this case to the left of the initial point 602. This new point 608 also is utilized in conjunction with a chromatic adjustment 610 and intensity adjustment 612 as shown from FIG. 2. At this gray level, as indicated by point 608, the chromatic and intensity adjustments are made to reach the desired white point. This is repeated as desired until a satisfactory number of gray levels have been set. This data is then provided for color correction levels or transformations at each one of the control points. For gray levels other than the specific points 602 and 608 interpolation or extrapolation as required are used to determine the actual transformations being used. The use of these multiple control points provides a better correlation over the entire range of the intensity of the display. The trade-off is the amount of time required. If just a quick simple adjustment is needed then the simpler operations of FIG. 1 or FIG. 2 are preferably utilized without the more detailed gray level adjustments of FIG. 6. When the environment is intended to be more permanent, such as in the display of a desktop computer in a given room which is not likely to change much, then the more detailed gray ramp embodiment of FIG. 6 can be utilized.

Figure 7:
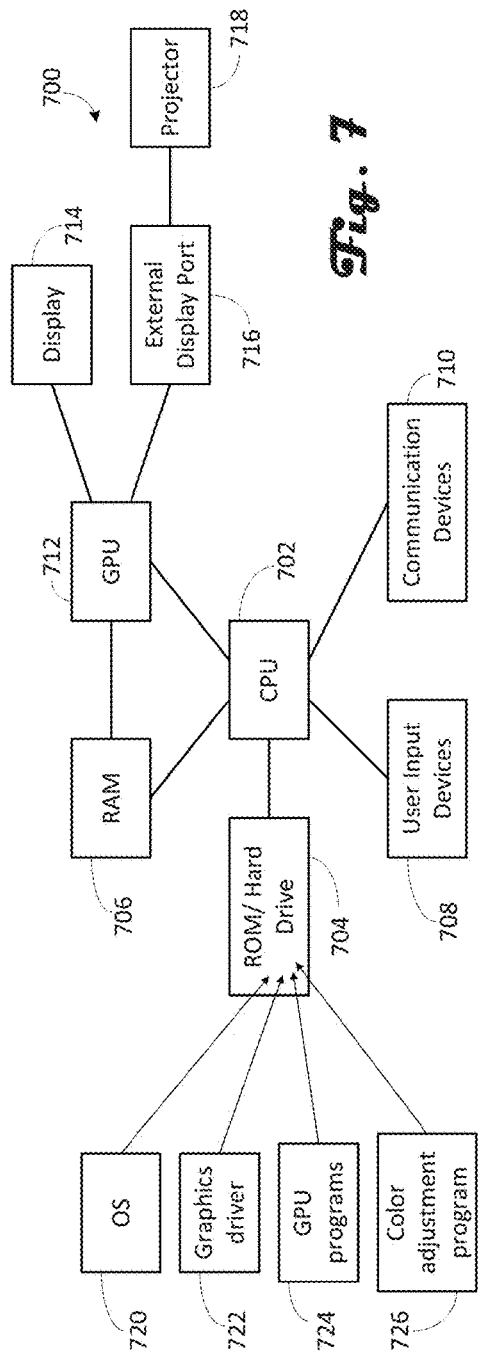
FIG. 7 is a block diagram of a computer according to the present invention.

FIG. 7 illustrates an exemplary computing device 700, exemplary of a cell phone, tablet, desktop computer or laptop computer or similar devices. A CPU 702 is utilized to perform the basic computing operations. A ROM and/or hard drive 704 is connected to the CPU 702 to provide long-term storage of operating system and programs as desired. Programs include the operating system (OS) 720, graphics drivers 722, GPU programs 724 and the color adjustment program 726. Random-access memory (RAM) 706 is connected to the CPU 702 to provide for working memory such as when programs are executing and for data storage. User input devices 708 and communication devices 710 are connected to the CPU 702. User input devices 708 vary based on the computing device 700. For example a touchscreen for a cell phone or tablet or a keyboard and pointing device such as a mouse for a desktop computer. Communications devices 710 preferably include wireless and wired connections such as Bluetooth, Wi-Fi and wired Ethernet and any desired cellular connections.

A GPU 712 is connected to the CPU 702 and to the RAM 706 because in the preferred embodiment the RAM 706 is shared between CPU 702 and GPU 712. In an alternate embodiment the RAM 706 contains a portion dedicated to the CPU 702 and a portion dedicated to the GPU 712. The GPU 712, in combination with the CPU 702 as required, performs the required graphics operations to develop the image which is ultimately displayed. To that end a display 714 such as an LCD display used in a smartphone tablet or laptop computer or a monitor used with a desktop computer is connected to the GPU 712. A port 716 for connection of an external display device is also connected to the GPU 712. In the illustrated embodiment a projector 718 is connected to the port 716 to provide the projected image of FIGS. 3, 4 and 5. The CPU 702 and a GPU 712 interact and execute particular programs, such as the operating system 720 and graphics driver 722, to perform both the display color correction 802 and the environment color correction 804, or their combined form, as desired.

While separate display color correction 802 and environment color correction 804 are illustrated for ease of understanding, it is understood that that the two corrections 802 and 804 could be combined if desired into a single correction to simplify operation. The single correction could be stored as desired, preferably with the display color correction also stored independently to allow a simple baseline from which to make further environmental corrections should the environment change, such as a laptop moved to a different lighting environment. In other embodiments only the single correction is stored, with the next setting operation proceeding from that correction setting.

While color curves are illustrated, it is understood that these are for purposes of understanding and that in practice ICC profiles or LUTs would be utilized in the normal embodiments, depending upon the particular computing device. For example, in a desktop or laptop computer an ICC profile would generally be used as the operating system and graphics driver are designed to use ICC profiles. Cell phones, tablets and projectors would typically use LUTs as the operating systems of those devices do not utilize ICC profiles. The actual color correction or transformation can be done by the CPU in software or the GPU in hardware and/or software, depending on the particular capabilities of the GPU.

Embodiments according to the present invention allow a very quick and interactive setting of both the black point and the white point of a displayed image. The long and tedious and indirect settings of the prior art are not required but rather the white point is set directly by visual inspection of the user. Embodiments are provided that allow more detailed tuning if desired based on particular gray levels but those operations include the preferred white point setting mechanism at each of the desired gray levels.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for correcting a white point of a display, the method comprising:
   obtaining display color correction values for the display, wherein the display color correction values are associated with color settings for the display;
   displaying a white point geometric object, said white point geometric object including an outer ring including a red green blue (RGB) color gradient;
   displaying a white region having a base color value of white;
   displaying a white point adjustment object, said white point adjustment object movable by a user with relation to said outer ring;
   adjusting a displayed color of said white region based on changing a location of said white point adjustment object from being at a center location with relation to said outer ring to a second location that is out from the center location;
   setting, when indicated by the user, environment color correction values that adjust the color settings of the display, wherein said environment color correction values correspond to compensating for environment conditions that distort color to be generated from the display; and
   transforming an image to be provided to the display based on said environment color correction values, wherein said environment color correction values include RGB correction values that define a white point display setting and are based on RGB values of said display color correction values and RGB color information associated with the second location of said white point adjustment object.

2. The method of claim 1, further comprising:
   displaying a slider adjacent said white point geometric object, said slider including a movable portion; and
   adjusting an intensity of said white region based on a location of said slider movable portion, which provides an intensity value,
   wherein setting environmental color correction values is based on said intensity value.

3. The method of claim 1, further comprising:
   displaying, after setting the white point display setting, a gray tracking adjustment object, said gray tracking adjustment object including:
      a gray ramp,
      a first pointer and
      a first white point adjustment group associated with said first pointer, wherein said first white point adjustment group includes:
         a first gray tracking white point geometric object, said first gray tracking white point geometric object including a first gray tracking outer ring including a red green blue color gradient;
         a first gray tracking white region having a base color value of white;
         a first gray tracking white point adjustment object, said first gray tracking white point adjustment object movable by the user within said first gray tracking outer ring; and
         a first gray tracking slider adjacent said first gray tracking white point geometric object, said first gray tracking slider including a movable portion;
   adjusting a displayed color of said first gray tracking white region based on a location of said first gray tracking white point adjustment object with relation to said first gray tracking outer ring, which provides first gray tracking adjustment values;
   adjusting an intensity of said first gray tracking white region based on a location of said first gray tracking slider movable portion, which provides a first gray tracking intensity value;
   setting, when indicated by the user, first gray tracking correction values based on said first gray tracking adjustment values and said first gray tracking intensity value; and
   using said first gray tracking correction values to adjust images provided to the display.

4. The method of claim 3, further comprising:
   displaying, as a portion of said gray tracking adjustment object a second pointer and a second white point adjustment group associated with said second pointer, wherein said second white point adjustment group includes:

a second gray tracking white point geometric object, said second gray tracking white point geometric object including:
  a second gray tracking outer ring including a red green blue color gradient;
  a second gray tracking white region having a base color value of white;
  a second gray tracking white point adjustment object, said second gray tracking white point adjustment object movable by the user within said second gray tracking outer ring; and
  a second gray tracking slider adjacent said second gray tracking white point geometric object, said second gray tracking slider including a movable portion;
adjusting a displayed color of said second gray tracking white region based on a location of said second gray tracking white space point adjustment object with relation to said second gray tracking outer ring, which provides second gray tracking adjustment values;
adjusting an intensity of said second gray tracking white region based on a location of said second gray tracking slider movable portion, which provides a second gray tracking intensity value;
setting, when indicated by the user, second gray tracking correction values based on said second gray tracking adjustment values and said second gray tracking intensity value; and
using said second gray tracking correction values in conjunction with said first gray tracking values to adjust images provided to the display.

5. The method of claim 1, wherein the display color correction values are based on a display color transformation that transforms an internal RGB space to a target RGB space for the display.

6. The method of claim 1, wherein the display is a projector and the environment conditions include a color of a background that the projector presents the image on.

7. A non-transitory computer readable medium comprising instructions stored thereon that when executed by a processor cause the processor to perform a method, the method comprising:
  obtaining display color correction values for a display, wherein the display color correction values are indicative of color parameters set for the display;
  displaying a white point geometric object, said white point geometric object including an outer ring including a red green blue (RGB) color gradient;
  displaying a white region having a base color value of white;
  displaying a white point adjustment object, said white point adjustment object movable by a user with reference to said outer ring;
  adjusting a displayed color of said white region based on a location of said white point adjustment object with relation to said outer ring;
  displaying, after setting the white point display setting, a gray tracking adjustment object;
  adjusting a displayed color of a first gray tacking white region based on a location of said gray tracking adjustment object;
  adjusting the color parameters set for the display, when indicated by the user, by setting environment color correction values that offset color distortions caused from an environment of the display; and
  transforming an image to be provided to the display based on said environment color correction values, wherein said environment color correction values include RGB correction values that define a white point display setting and are based on RGB values of said display color correction values and RGB color information associated with the location of said white point adjustment object and the location of said gray tracking adjustment object.

8. The non-transitory computer readable medium of claim 7, the method further comprising:
  displaying a slider adjacent said white point geometric object, said slider including a movable portion; and
  adjusting an intensity of said white region based on a location of said slider movable portion, which provides an intensity value,
  wherein setting environmental color correction values is based on said intensity value.

9. The non-transitory computer readable medium of claim 7, the method further comprising:
  displaying a black point adjustment object, said black point adjustment object including a portion movable to indicate a value for a black point; and
  setting, when indicated by the user, the black point of the display based on said value for a black point.

10. The non-transitory computer readable medium of claim 9, the method further comprising:
  displaying, after setting the white point display setting and the black point of the display, said gray tracking adjustment object, said gray tracking adjustment object including:
    a gray ramp,
    a first pointer and
    a first white point adjustment group associated with said first pointer, wherein said first white point adjustment group includes:
      a first gray tracking white point geometric object, said first gray tracking white point geometric object including a first gray tracking outer ring including a red green blue color gradient;
      a first gray tracking white region having a base color value of white; a first gray tracking white point adjustment object, said first gray tracking white point adjustment object movable by the user within said first gray tracking outer ring; and
      a first gray tracking slider adjacent said first gray tracking white point geometric object, said first gray tracking slider including a movable portion;
  adjusting said displayed color of said first gray tracking white region based on a location of said first gray tracking white point adjustment object with relation to said first gray tracking outer ring to provide first gray tracking adjustment values;
  adjusting an intensity of said first gray tracking white region based on a location of said first gray tracking slider movable portion, which provides a first gray tracking intensity value;
  setting, when indicated by the user, first gray tracking correction values based on said first gray tracking adjustment values and said first gray tracking intensity value; and using said first gray tracking correction values to adjust images provided to the display.

11. The non-transitory computer readable medium of claim 10, the method further comprising:
  displaying, as a portion of said gray tracking adjustment object a second pointer and a second white point adjustment group associated with said second pointer, wherein said second white point adjustment group includes:

a second gray tracking white point geometric object, said second gray tracking white point geometric object including:
  a second gray tracking outer ring including a red green blue color gradient;
  a second gray tracking white region having a base color value of white;
  a second gray tracking white point adjustment object, said second gray tracking white point adjustment object movable by the user within said second gray tracking outer ring; and
  a second gray tracking slider adjacent said second gray tracking white point geometric object, said second gray tracking slider including a movable portion;
adjusting a displayed color of said second gray tracking white region based on a location of said second gray tracking white point adjustment object with relation to said second gray tracking outer ring to provide second gray tracking adjustment values;
adjusting an intensity of said second gray tracking white region based on a location of said second gray tracking slider movable portion, which provides a second gray tracking intensity value;
setting, when indicated by the user, second gray tracking correction values based on said second gray tracking adjustment values and said second gray tracking intensity value; and
using said second gray tracking correction values and said first gray tracking values to adjust images provided to the display.

12. The non-transitory computer readable medium of claim 7, wherein the display is a projector and the color distortions caused from the environment include a color of a background that the projector presents the image on and lighting of the environment.

13. The non-transitory computer readable medium of claim 7, wherein the display color correction values are based on a display color transformation that transforms an internal RGB space to a target RGB space for the display.

14. A computer comprising:
  at least one of a display and a display output port;
  a user input device;
  a central processing unit (CPU) coupled to said user input device;
  a graphics processing unit (GPU) coupled to said CPU and said at least one of a display and a display output port; and
  memory coupled to said CPU and said GPU, said memory storing a program which, when executed, a combination of said CPU and said GPU to perform the following for setting a white point display setting of a display:
    obtaining display color correction values for the display or a second display connected to the display output port, wherein the display color correction values are associated with a display color setting for the display;
    displaying a white point geometric object, said white point geometric object including an outer ring including a red green blue color gradient;
    displaying a white region having a base color value of white;
    displaying a white point adjustment object, said white point adjustment object movable by a user with relation to said outer ring;
    adjusting the displayed color of said white region based on changing a location of said white point adjustment object from being at a center location with relation to said outer ring to a second location that is out from the center location;
    setting, when indicated by the user, environment color correction values that adjust the display color setting, wherein said environment color correction values compensate for environment conditions that distort color to be generated from the display; and
    transforming an image to be provided to the display or the second display connected to the display output port based on said environment color correction values, wherein said environment color correction values include RGB correction values that define the white point display setting and are based on RGB values of said display color correction values and RGB color information associated with the location of said white point adjustment object.

15. The computer of claim 14, wherein the program further causes the combination of said CPU and said GPU to:
  display a slider adjacent said white point geometric object, said slider including a movable portion; and
  adjust an intensity of said white region based on a location of said slider movable portion, which provides an intensity value,
  wherein setting of environmental color correction values is based on said intensity value.

16. The computer of claim 14, wherein the program further causes the combination of said CPU and said GPU to:
  display a black point adjustment object, said black point adjustment object including a portion movable to indicate a value for a black point; and
  set, when indicated by the user, the black point of the display based on said value for a black point.

17. The computer of claim 16, wherein the program further causes the combination of said CPU and said GPU to:
  display, after setting the white point display setting and the black point of the display, a gray tracking adjustment object, said gray tracking adjustment object including:
    a gray ramp,
    a first pointer and
    a first white point adjustment group associated with said first pointer, wherein said first white point adjustment group includes:
      a first gray tracking white point geometric object, said first gray tracking white point geometric object including a first gray tracking outer ring including a red green blue color gradient;
      a first gray tracking white region having a base color value of white;
      a first gray tracking white point adjustment object, said first gray tracking white point adjustment object movable by the user within said first gray tracking outer ring; and
      a first gray tracking slider adjacent said first gray tracking white point geometric object, said first gray tracking slider including a movable portion;
  adjust a displayed color of said first gray tracking white region based on a location of said first gray tracking white point adjustment object with relation to said first gray tracking outer ring, which provides first gray tracking adjustment values;

adjusting an intensity of said first gray tracking white region based on a location of said first gray tracking slider movable portion, which provides a first gray tracking intensity value;

set, when indicated by the user, first gray tracking correction values based on said first gray tracking adjustment values and said first gray tracking intensity value; and use said first gray tracking correction values to adjust images provided to the display.

18. The computer of claim 17, wherein the program further causes the combination of said CPU and said GPU to:

display, as a portion of said gray tracking adjustment object a second pointer and a second white point adjustment group associated with said second pointer, wherein said second white point adjustment group includes:

a second gray tracking white point geometric object, said second gray tracking white point geometric object including:

a second gray tracking outer ring including a red green blue color gradient;

a second gray tracking white region having a base color value of white;

a second gray tracking white point adjustment object, said second gray tracking white point adjustment object movable by the user within said second gray tracking outer ring; and a second gray tracking slider adjacent said second gray tracking white point geometric object, said second gray tracking slider including a movable portion;

adjust a displayed color of said second gray tracking white region based on a location of said second gray tracking white point adjustment object with relation to said second gray tracking outer ring, which provides second gray tracking adjustment values;

adjust an intensity of said second gray tracking white region based on a location of said second gray tracking slider movable portion, which provides a second gray tracking intensity value;

set, when indicated by the user, second gray tracking correction values based on said second gray tracking adjustment values and said second gray tracking intensity value; and use said second gray tracking correction values in conjunction with said first gray tracking values to adjust images provided to the display.

19. The computer of claim 14, wherein the display color correction values are based on a display color transformation that transforms an internal RGB space to a target RGB space for the display.

20. The computer of claim 14, wherein the environment conditions include a color of a background that the display presents the image on.

* * * * *

UNITED STATES PATENT AND TRADEMARK OFFICE
CERTIFICATE OF CORRECTION

PATENT NO. : 10,217,438 B2
APPLICATION NO. : 14/291194
DATED : February 26, 2019
INVENTOR(S) : Gabriel Marcu et al.

Page 1 of 1

It is certified that error appears in the above-identified patent and that said Letters Patent is hereby corrected as shown below:

In the Claims

Claim 7 at Column 9, Line 59 should read:
-- adjusting a displayed color of a first gray tracking white --

Signed and Sealed this
Second Day of April, 2019

Andrei Iancu
*Director of the United States Patent and Trademark Office*